(12) United States Patent
Watanabe et al.

(10) Patent No.: US 10,789,850 B2
(45) Date of Patent: Sep. 29, 2020

(54) OBSTACLE DETECTION DEVICE, DRIVING ASSISTANCE SYSTEM, AND OBSTACLE DETECTION METHOD

(71) Applicant: Mitsubishi Electric Corporation, Chiyoda-ku (JP)

(72) Inventors: Shintaro Watanabe, Tokyo (JP); Shoichi Shimizu, Tokyo (JP); Junji Hori, Tokyo (JP); Wataru Tsujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 169 days.

(21) Appl. No.: 16/097,434

(22) PCT Filed: Mar. 23, 2017

(86) PCT No.: PCT/JP2017/011752
§ 371 (c)(1),
(2) Date: Oct. 29, 2018

(87) PCT Pub. No.: WO2017/195477
PCT Pub. Date: Nov. 16, 2017

(65) Prior Publication Data
US 2020/0265718 A1    Aug. 20, 2020

(30) Foreign Application Priority Data

May 10, 2016   (JP) ................... 2016-094690

(51) Int. Cl.
*G08G 1/16*      (2006.01)
*B60T 7/12*      (2006.01)
(Continued)

(52) U.S. Cl.
CPC ............. *G08G 1/166* (2013.01); *B60Q 9/00* (2013.01); *B60T 7/12* (2013.01); *G06K 9/00201* (2013.01);
(Continued)

(58) Field of Classification Search
CPC ............. G05D 1/0248; G05D 1/0238; G05D 2201/0206; G05D 2201/0211;
(Continued)

(56) References Cited

U.S. PATENT DOCUMENTS 4,255,762 A  *  3/1981 Takeyasu ........... G02B 23/2476
                                                   348/84
6,142,252 A  * 11/2000 Kinto .................. G05D 1/0221
                                                   180/204
(Continued)

FOREIGN PATENT DOCUMENTS

JP       5-201298 A      8/1993
JP       6-26859 A       2/1994
(Continued)

OTHER PUBLICATIONS

International Search Report dated Jun. 20, 2017 in PCT/JP2017/011752 filed on Mar. 23, 2017.

*Primary Examiner* — Aklilu K Woldemariam
(74) *Attorney, Agent, or Firm* — Xsensus LLP

(57) ABSTRACT

A first light projector projects first slit light that spreads in the width direction of a vehicle in a direction other than a direction parallel to a contact ground surface. A second light projector projects second slit light that spreads in the width direction of the vehicle in a direction parallel to the contact ground surface. An obstacle detection unit detects an obstacle using a captured image of an area surrounding the vehicle where the first slit light and the second slit light are projected.

19 Claims, 18 Drawing Sheets

(51) Int. Cl.
*B60Q 9/00* (2006.01)
*G06K 9/00* (2006.01)
*G06T 7/246* (2017.01)
*G06T 7/521* (2017.01)
*G06T 7/73* (2017.01)
*H04N 5/225* (2006.01)
*G06K 9/20* (2006.01)

(52) U.S. Cl.
CPC ....... *G06K 9/00805* (2013.01); *G06K 9/2036* (2013.01); *G06T 7/246* (2017.01); *G06T 7/521* (2017.01); *G06T 7/73* (2017.01); *H04N 5/2256* (2013.01); *B60T 2201/022* (2013.01); *B60T 2210/32* (2013.01); *G06T 2207/30261* (2013.01)

(58) Field of Classification Search
CPC ............. G05D 1/0274; G06K 9/00664; G06K 9/00805; G06K 9/2036; G06K 9/32; G06K 9/6211; G06K 9/00812; G06K 9/00288; G01C 11/06; G06T 2207/10012; G06T 7/593; H04N 13/189; H04N 13/239; G01J 3/02; G01J 3/0202; G01J 3/0291; G01J 3/06; G01J 3/18; G01J 3/28; B60Q 9/004; B60R 11/04; B60R 1/00; B60R 2300/103; B60R 2300/8053; B60R 2300/8093; B61L 23/041; G01S 7/4808; F21S 41/153; F21S 41/663; F21V 23/0471; A47L 2201/04; B25J 9/1694; Y10S 901/46
USPC .......... 348/84, 148; 382/103, 104, 106, 154, 382/199
See application file for complete search history.

(56) References Cited

U.S. PATENT DOCUMENTS

| | | | |
|---|---|---|---|
| 6,215,898 B1* | 4/2001 | Woodfill | G06K 9/32 382/154 |
| 6,285,778 B1 | 9/2001 | Nakajima et al. | |
| 9,234,618 B1* | 1/2016 | Zhu | G05D 1/0088 |
| 2001/0003958 A1* | 6/2001 | Murata | B61L 23/005 104/299 |
| 2004/0031906 A1* | 2/2004 | Glecker | G01J 3/2823 250/208.1 |
| 2004/0234122 A1* | 11/2004 | Kochi | H04N 13/243 382/154 |
| 2005/0192701 A1* | 9/2005 | Ben-Ezra | B07C 5/36 700/213 |
| 2006/0176480 A1* | 8/2006 | Toth | G01J 3/28 356/328 |
| 2009/0309710 A1* | 12/2009 | Kakinami | G06K 9/00805 340/435 |
| 2010/0045448 A1* | 2/2010 | Kakinami | G06T 7/579 340/435 |
| 2013/0226344 A1* | 8/2013 | Wong | G05D 1/0242 700/258 |
| 2013/0258635 A1* | 10/2013 | Kato | G01D 13/265 362/23.02 |
| 2016/0188977 A1* | 6/2016 | Kearns | G05D 1/0274 348/113 |

FOREIGN PATENT DOCUMENTS

| | | |
|---|---|---|
| JP | 2004-198212 A | 7/2004 |
| JP | 2007-326428 A | 12/2007 |
| JP | 2007-327803 A | 12/2007 |
| JP | 2008-51759 A | 3/2008 |

* cited by examiner

OBSTACLE DETECTION DEVICE, DRIVING ASSISTANCE SYSTEM, AND OBSTACLE DETECTION METHOD

TECHNICAL FIELD

The present invention relates to an obstacle detection device and an obstacle detection method for detecting an obstacle around a vehicle and a driving assistance system that assists driving of the vehicle on the basis of a detection result of the obstacle detection device.

BACKGROUND ART

In the related art, as an example of a method of measuring a three-dimensional shape, there is a method as the following.

A slit light source projects slit light toward an object a three-dimensional shape of which is to be measured. A camera installed at a position apart from the slit light source captures an image of the slit light hitting on the object. A processing means detects the slit light in the image captured by the camera and reconstructs a cutting shape obtained by slicing the object with the slit light on the basis of the principle of triangulation. A three-dimensional shape of the whole object is reconstructed with the camera repeatedly capturing images and the processing means sequentially reconstructing and integrating cutting shapes while the slit light source scans the object with the slit light.

An application of the measuring method of a three-dimensional shape to a vehicle is a parking assistance device described in Patent Literature 1. In the parking assistance device described in Patent Literature 1, a slit light source and a camera are installed on a vehicle, and the slit light scans an area surrounding the vehicle as the vehicle travels, and the camera repeatedly captures images of the area. A processing means reconstructs a three-dimensional shape of the area surrounding the vehicle and extracts a parking space by using the individual images repeatedly captured along with the travel of the vehicle.

CITATION LIST

Patent Literature

Patent Literature 1: JP 2007-326428 A

SUMMARY OF INVENTION

Technical Problem

The invention according to Patent Literature 1 described above has a configuration that reconstructs a three-dimensional shape of an area surrounding the vehicle by integrating cutting shapes sequentially acquired during the travel of the vehicle. That is, the individual cutting shapes are acquired at different time, and thus this can be understood as a measuring method of a three-dimensional shape on the premise that an object does not move in the area surrounding the vehicle. Therefore, there is a problem that an erroneous three-dimensional shape is reconstructed in a case where there is a moving object, for example, a pedestrian or another vehicle in the area surrounding the vehicle because cutting shapes of this corresponding part are not correctly integrated. It is of course not possible to determine which part of the reconstructed three-dimensional shape corresponds to a moving object.

The invention has been devised in order to solve the problems as described above. It is an object of the present invention to correctly reconstruct a three-dimensional shape of an area surrounding a vehicle even when a moving object is present.

Solution to Problem

An obstacle detection device according to the present invention includes: a first light projecting unit for projecting first slit light toward an area surrounding a vehicle; a second light projecting unit for projecting second slit light that spreads in a width direction or a front-rear direction of the vehicle toward the area surrounding the vehicle in a direction parallel to a contact ground surface on the vehicle; an imaging unit for capturing an image of the area surrounding the vehicle from a position not included on either a plane including a direction in which the first slit light spreads and a direction in which the first slit light is projected or a plane including the direction in which the second slit light spreads and the direction in which the second slit light is projected; a first reconstruction unit for reconstructing a shape of a part hit by the first slit light using the image captured by the imaging unit; a second reconstruction unit for reconstructing a shape of a part hit by the second slit light using the image captured by the imaging unit; a travel amount calculating unit for calculating a travel amount of the vehicle; and a moving object detecting unit for detecting a moving object in the area surrounding the vehicle using the shape reconstructed by the second reconstruction unit and the travel amount of the vehicle calculated by the travel amount calculating unit. The obstacle detection device detects an obstacle using the the shape reconstructed by the first reconstruction unit the shape reconstructed by the second reconstruction unit, and the travel amount of the vehicle calculated by the travel amount calculating unit.

Advantageous Effects of Invention

According to the present invention, the second slit light is projected in a direction parallel to the contact ground surface, and thus a position hit by the second slit light does not move even when the vehicle travels. Therefore, when an object in the area surrounding the vehicle is stationary, the position hit by the second slit light is the same, whereas when the object is moving, the position hit by the second slit light changes. With this configuration, it is possible to discriminate whether the object is stationary or moving by detecting the change in the part hit by the second slit light. Therefore, even when a moving object is present, it is possible to correctly reconstruct a three-dimensional shape of the area surrounding the vehicle, thereby enabling detection of an obstacle using the three-dimensional shape.

DESCRIPTION OF EMBODIMENTS

To describe the present invention further in detail, embodiments for carrying out the present invention will be described below with reference to the accompanying drawings.

First Embodiment

Figure 1:
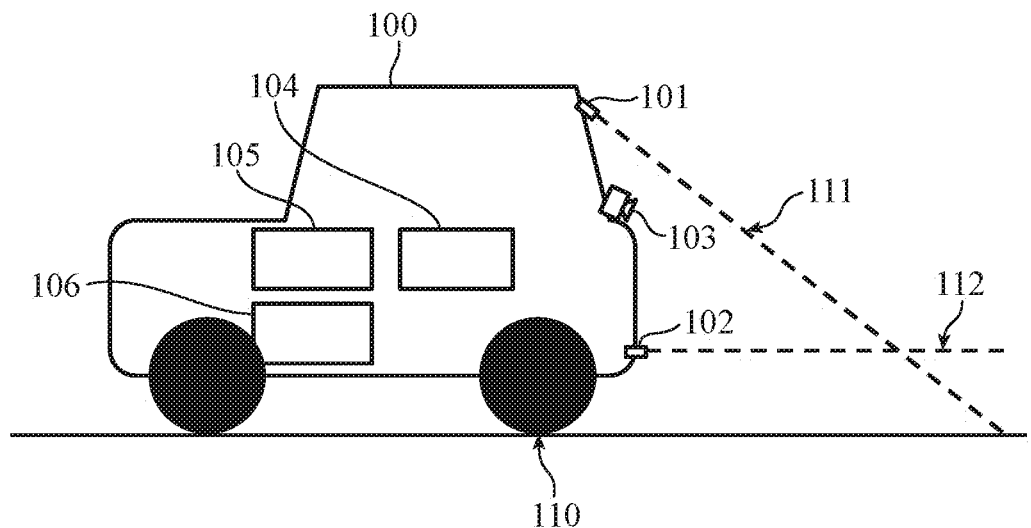
FIG. 1 is a diagram illustrating a vehicle on which an obstacle detection device according to a first embodiment of the present invention is mounted.

FIG. 1 is a diagram illustrating a vehicle 100 on which an obstacle detection device according to a first embodiment of the present invention is mounted. The obstacle detection device includes a first light projector 101, a second light projector 102, a camera 103, and an obstacle detection unit 104 and detects an obstacle present around the vehicle 100. The obstacle detection device further acquires measurement results of a yaw rate sensor 105 and a vehicle speed sensor 106 mounted on the vehicle 100 and uses the results for obstacle detection.

The first light projector 101 and the second light projector 102 mounted on the vehicle 100 project first slit light 111 and second slit light 112 toward an area surrounding the vehicle, respectively. The camera 103 mounted on the vehicle 100 captures an image of an area surrounding the vehicle where the first slit light 111 and the second slit light 112 are projected. The obstacle detection unit 104 detects an obstacle in the area surrounding the vehicle. The yaw rate sensor 105 mounted on the vehicle 100 measures the yaw rate thereof. The vehicle speed sensor 106 mounted on the vehicle 100 measures the vehicle speed.

Note that FIG. 1 illustrates the example in which the first light projector 101, the second light projector 102, and the camera 103 are mounted on a rear part of the vehicle 100. In this case, the area surrounding the vehicle is an area behind the vehicle 100. In addition, the ground in contact with tires of the vehicle 100 is referred to as a contact ground surface 110.

The first light projector 101 projects the first slit light 111 that spreads in the width direction of the vehicle 100. In addition, the first light projector 101 is installed on the vehicle 100 so as to project the first slit light 111 at an angle not horizontal with respect to the contact ground surface 110 on the vehicle 100. The installation angle of the first light projector 101 may be obliquely downward or obliquely upward, for example.

Here, the width direction of the vehicle 100 refers to the left-right direction of the vehicle 100 when the vehicle is viewed from above. That is, the depth direction on the paper surface of FIG. 1 is the width direction of the vehicle 100.

Therefore, the first slit light 111 spreads in the width direction of the vehicle 100 and is projected at an angle not parallel to the contact ground surface 110. In the example of FIG. 1, the first slit light 111 is projected obliquely downward. The first slit light 111 spreads little in a direction perpendicular to both the width direction of the vehicle 100 and the projection direction of the first slit light 111.

The second light projector 102 projects the second slit light 112 that spreads in the width direction of the vehicle, in other words, spreading in a planar shape parallel to the contact ground surface 110, and the second light projector 102 is installed on the vehicle 100 so as to project the second slit light 112 in a direction parallel to the contact ground surface 110 on the vehicle 100. That is, the installation angle of the second light projector 102 is parallel to the contact ground surface 110.

Therefore, the second slit light 112 spreads in a planar shape parallel to the contact ground surface 110 on the vehicle 100 and is projected at an angle parallel to the contact ground surface 110. In addition, the second slit light 112 spreads little in the vertical direction that is perpendicular to the contact ground surface 110.

The camera 103 is installed at a position in the vehicle 100 different from those of the first light projector 101 and the second light projector 102. In the example of FIG. 1, the camera 103 is installed at a height different from those of the first light projector 101 and the second light projector 102. Moreover, the camera 103 is installed at an angle allowing the camera to capture an image of an area surrounding the vehicle where the first slit light 111 and the second slit light 112 are projected. More specifically, the camera 103 is installed at an angle at which the range where the first slit light 111 is projected onto the contact ground surface 110 can be captured.

Figure 2:
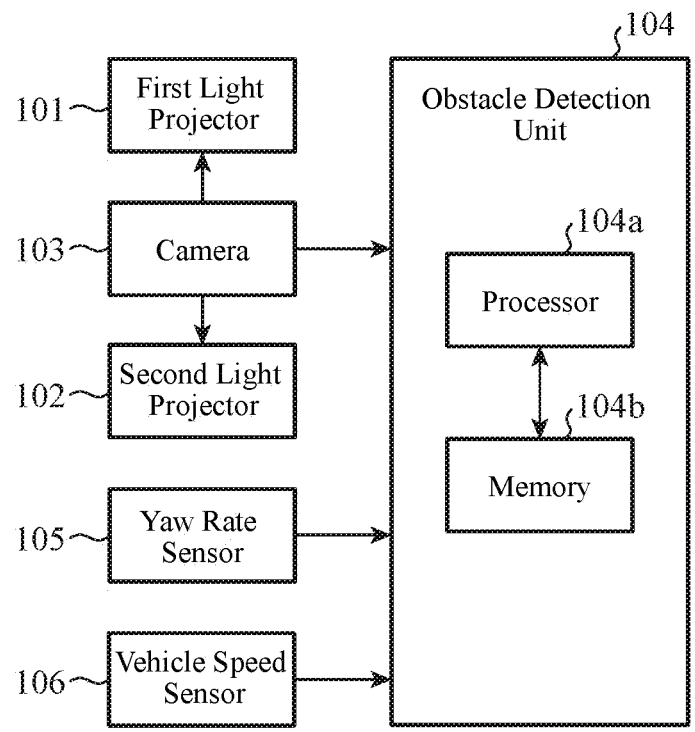
FIG. 2 is a hardware diagram of the obstacle detection device according to the first embodiment.

FIG. 2 is a hardware configuration diagram of the obstacle detection device according to the first embodiment.

The camera 103 is connected to the obstacle detection unit 104. The camera 103 captures an image of the area surrounding the vehicle where the first slit light 111 and the second slit light 112 are projected and outputs the captured image to the obstacle detection unit 104. The camera 103 is further connected to the first light projector 101 and the second light projector 102. For example as will be described later, the camera 103 outputs a synchronization signal indicating an imaging timing of the camera 103 to the first light projector 101 and the second light projector 102.

The obstacle detection unit 104 includes a processor 104a and a memory 104b. Details of the obstacle detection unit 104 will be described later.

The yaw rate sensor 105 and the vehicle speed sensor 106 are connected to the obstacle detection unit 104. The yaw rate sensor 105 measures the yaw rate of the vehicle 100 and outputs the result to the obstacle detection unit 104. The vehicle speed sensor 106 measures the vehicle speed of the vehicle 100 and outputs the result to the obstacle detection unit 104.

Figure 3:
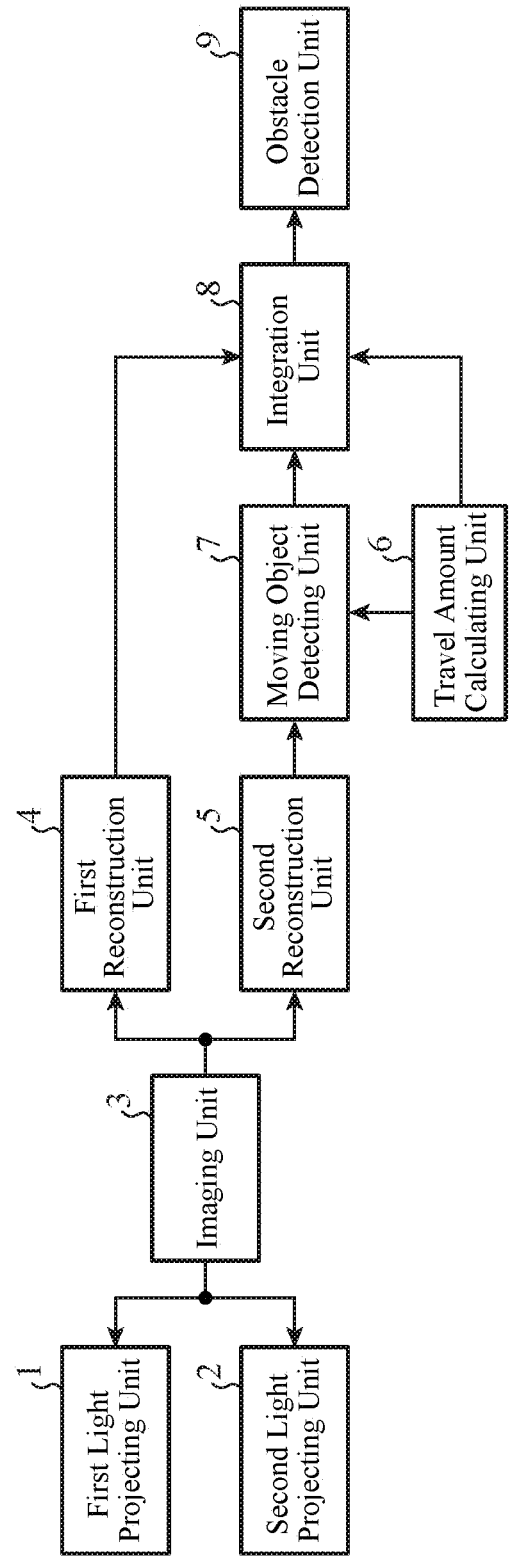
FIG. 3 is a functional block diagram of the obstacle detection device according to the first embodiment.

FIG. 3 is a functional block diagram of the obstacle detection device according to the first embodiment.

A first light projecting unit 1 projects the first slit light 111 to the area surrounding the vehicle. The first light projecting unit 1 includes the above-described first light projector 101 and a controller for controlling the light projection timing and the like of the first light projector 101. Alternatively, the first light projecting unit 1 may solely be a controller that controls the first light projector 101. That is, the first light projecting unit 1 is only required to be capable of controlling the first light projector 101 so that, as a result, the first slit light 111 can be projected to the area surrounding the vehicle.

The second light projecting unit 2 projects the second slit light 112 that spreads in the width direction of the vehicle 100, in other words, spreading in a planar shape parallel to the contact ground surface 110, toward the area surrounding the vehicle in a direction parallel to the contact ground surface 110 on the vehicle 100. The second light projecting unit 2 includes the above-described second light projector 102 and a controller for controlling the light projecting timing and the like of the second light projector 102. Alternatively, the second light projecting unit 2 may solely be a controller that controls the second light projector 102. That is, the second light projecting unit 2 is only required to be capable of controlling the second light projector 102 so that, as a result, the second slit light 112 can be projected to the area surrounding the vehicle.

The imaging unit 3 captures an image of the area surrounding the vehicle from a direction different from those in which the first slit light 111 and the second slit light 112 are projected. The imaging unit 3 includes the above-described camera 103 and a controller for controlling the imaging timing and the like of the camera 103. Alternatively, the imaging unit 3 may solely be a controller that controls the camera 103. That is, the imaging unit 3 is only required to be capable of controlling the camera 103 so that, as a result, an image of an area surrounding the vehicle can be captured from a direction different from those in which the first slit light 111 and the second slit light 112 are projected. With the movement of the vehicle 100, the first slit light 111 scans the area surrounding the vehicle, and the imaging unit 3 repeatedly captures images of the area.

The obstacle detection unit 104 corresponds to: a first reconstruction unit 4 for reconstructing a shape of a part hit by the first slit light 111 using the image captured by the imaging unit 3; a second reconstruction unit 5 for reconstructing a shape of a part hit by the second slit light 112 using the image captured by the imaging unit 3; a travel amount calculating unit 6 for calculating a travel amount of the vehicle 100; a moving object detecting unit 7 for detecting a moving object in the area surrounding the vehicle using the shape reconstructed by the second reconstruction unit 5 and the travel amount of the vehicle 100 calculated by the travel amount calculating unit 6; an integration unit 8 for reconstructing a three-dimensional shape of the area surrounding the vehicle by integrating the shapes reconstructed by the first reconstruction unit 4 using the travel amount of the vehicle 100 calculated by the travel amount calculating unit 6 and information of the moving object detected by the moving object detecting unit 7; and an obstacle detection unit 9 for detecting an obstacle using the three-dimensional shape reconstructed by the integration unit 8.

The functions of the first reconstruction unit 4, the second reconstruction unit 5, the travel amount calculating unit 6, the moving object detecting unit 7, the integration unit 8, and the obstacle detection unit 9 in the obstacle detection unit 104 are implemented by software, firmware, or a combination of software and firmware. Software and firmware are described as a program and stored in the memory 104b illustrated in FIG. 2. The processor 104a reads and executes the program stored in the memory 104b and thereby implements the functions of the respective units. In other words, the obstacle detection device includes the memory 104b for storing a program that, when executed by the processor 104a, results in execution of: a step of reconstructing a shape of a part hit by the first slit light 111 using the image captured by the imaging unit 3; a step of reconstructing a shape of a part hit by the second slit light 112 using the image captured by the imaging unit 3; a step of calculating a travel amount of the vehicle 100; a step of detecting a moving object in the area surrounding the vehicle using the shape reconstructed by the second reconstruction unit 5 and the travel amount of the vehicle 100 calculated by the travel amount calculating unit 6; a step of reconstructing a three-dimensional shape of the area surrounding the vehicle by integrating the shapes reconstructed by the first reconstruction unit 4 using the travel amount of the vehicle 100 calculated by the travel amount calculating unit 6 and information of the moving object detected by the moving object detecting unit 7; and a step of detecting an obstacle using the three-dimensional shape reconstructed by the integration unit 8. In other words, this program causes a computer to execute a procedure or a method of the first reconstruction unit 4, the second reconstruction unit 5, the travel amount calculating unit 6, the moving object detecting unit 7, the integration unit 8, and the obstacle detection unit 9.

In this embodiment, the processor 104a may be also referred to as a central processing unit (CPU), a processing device, a computing device, a microprocessor, a microcomputer, a DSP, or the like.

The memory 104b may be a nonvolatile or volatile semiconductor memory such as a random access memory (RAM), a read only memory (ROM), an erasable programmable ROM (EPROM), an electrically EPROM (EE-PROM), a flash memory, or a solid state drive (SSD), a magnetic disc such as a hard disc or a flexible disc, or an optical disc such as a compact disc (CD) or a digital versatile disc (DVD).

Note that the functions of the first light projecting unit 1, the second light projecting unit 2, and the imaging unit 3 as controllers may be implemented by using a dedicated processing circuit or may be implemented by using the processor 104a and the memory 104b of the obstacle detection unit 104. In the latter case, the functions of the first light projecting unit 1, the second light projecting unit 2, and the imaging unit 3 as controllers are described as a program and stored in the memory 104b, and reading out and executing the program by the processor 104a results in implementation of the functions of the first light projecting unit 1, the second light projecting unit 2, and the imaging unit 3 as controllers.

Upon reconstruction of the shapes of parts hit by slit light in the first reconstruction unit 4 and the second reconstruction unit 5, it is desirable to facilitate discrimination as to on which pixel each of the part hit by the first slit light 111 and the part hit by the second slit light 112 is captured in the captured image. Therefore, it is desirable to allow the first slit light 111 and the second slit light 112 to be distinguished from each other at the time of capturing the image.

For example, by differently changing the thickness of the first slit light 111 projected by the first light projector 101 and the thickness of the second slit light 112 projected by the second light projector 102, they can be distinguished in the obstacle detection unit 104.

Alternatively, by differently changing the color (wavelength) of the first slit light 111 projected by the first light projector 101 and the color (wavelength) of the second slit light 112 projected by the second light projector 102, they can be distinguished.

Further alternatively, a synchronization signal of the camera 103 may be input to the first light projector 101 and the second light projector 102, so that a timing at which only the first light projector 101 projects the first slit light 111 and a timing at which only the second light projector 102 projects the second slit light 112 are alternately repeated in synchronization with imaging timings of the camera 103. As a result, an image in which only the first slit light 111 is captured and an image in which only the second slit light 112 is captured are alternately captured, thereby allowing them to be distinguished.

In addition, it is required that parts hit by the first slit light 111 and the second slit light 112 have a signal level that enables detection in a captured image. For that purpose, it is desirable for the first light projector 101 and the second light projector 102 to project the first slit light 111 and the second slit light 112 with sufficient light intensity.

In order to ensure a sufficient light intensity, for example, a synchronization signal of the camera 103 is input to the first light projector 101 and the second light projector 102, and the first light projector 101 and the second light projector 102 project the first slit light 111 and the second slit light 112, respectively, each having an instantaneously strong light intensity in synchronization with imaging timings of the camera 103.

Alternatively, the presence of slit light may be detected by grasping a difference between projection of the slit light and no projection of the slit light by image processing by the obstacle detection unit 104. That is, in synchronization with the imaging timings of the camera 103, a timing at which only the first light projector 101 projects the first slit light 111, a timing at which neither the first light projector 101 nor the second light projector 102 projects slit light, a timing at which only the second light projector 102 projects the second slit light 112, and the timing at which neither the first light projector 101 nor the second light projector 102 projects slit light are repeated. The first reconstruction unit 4 can detect a part hit by the first slit light 111 by calculating a difference between an image that is captured at the timing at which only the first light projector 101 projects the first slit light 111 and an image captured at the timing at which neither the first light projector 101 nor the second light projector 102 projects slit light. Similarly, the second reconstruction unit 5 can detect a part hit by the second slit light 112 by calculating a difference between an image that is captured at the timing at which only the second light projector 102 projects the second slit light 112 and an image captured at the timing at which neither the first light projector 101 nor the second light projector 102 projects slit light.

Next, details of the obstacle detection device will be described with reference to FIG. 3.

The first reconstruction unit 4 receives a captured image from the imaging unit 3, reconstructs the shape of a part hit by the first slit light 111 from the image, and outputs the reconstructed information to the integration unit 8. The shape of the part hit by the first slit light 111 and reconstructed by the first reconstruction unit 4 is referred to as a "first cutting shape".

The first reconstruction unit 4 can detect pixels hit by the first slit light 111 from the image, by performing binarization through threshold processing of luminance values of the image by utilizing the fact that pixels of the part hit by the first slit light 111 on the image is brighter than the surrounding pixels. The first reconstruction unit 4 reconstructs the first cutting shape from the information of the pixels hit by the first slit light 111 detected in this manner. The first reconstruction unit 4 uses an algorithm called a light-section method, for example, to reconstruct the cutting shape.

Figure 4:
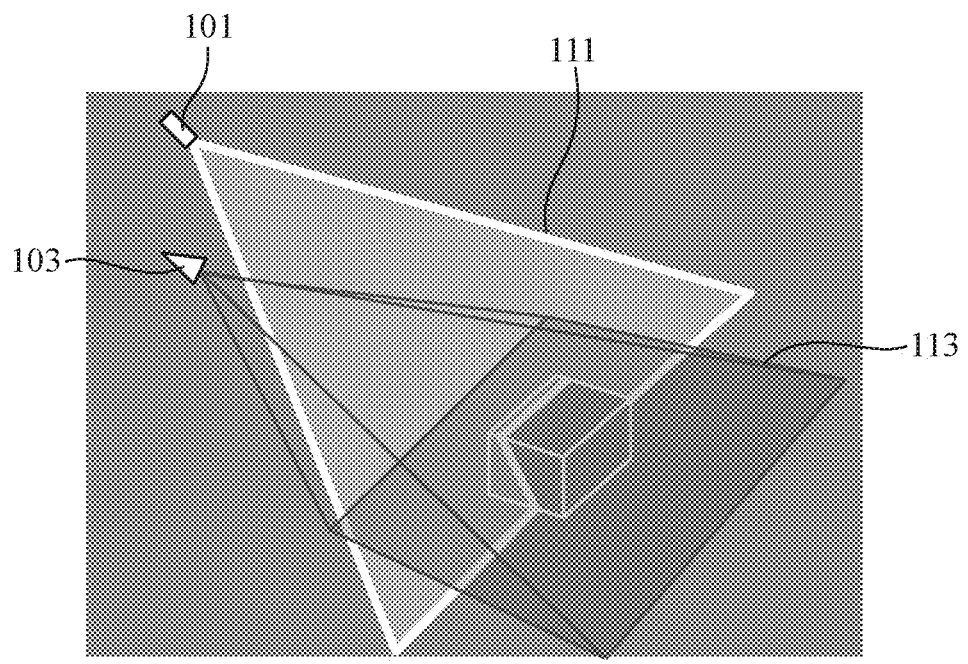
FIG. 4 is a diagram explaining a light-section method performed by a first reconstruction unit of the obstacle detection device according to the first embodiment and illustrating a state of an area surrounding the vehicle.
Figure 5:
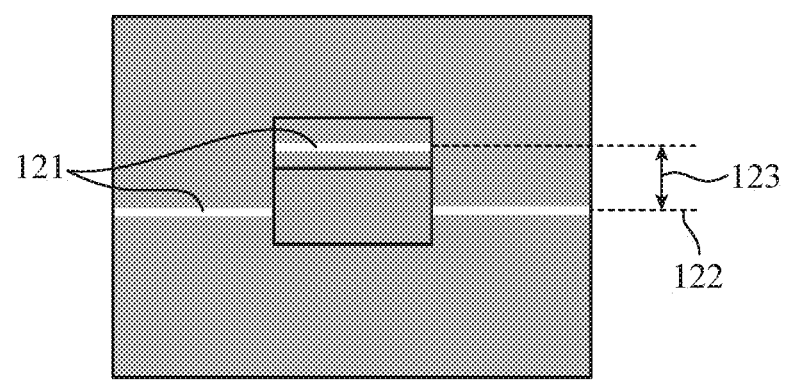
FIG. 5 is a diagram explaining the light-section method performed by the first reconstruction unit of the obstacle detection device according to the first embodiment and illustrating an image captured by a camera in FIG. 4.

FIGS. 4 and 5 are diagrams for explaining the light-section method performed by the first reconstruction unit 4.

FIG. 4 illustrates a state of the area surrounding the vehicle. In FIG. 4, the first light projector 101, the camera 103, the first slit light 111 projected from the first light projector 101, and an imaging area 113 of the camera 103 are illustrated. In FIG. 4, the first slit light 111 is expressed as a plane including the direction in which the first slit light 111 spreads and the direction in which the first slit light 111 is projected. The camera 103 captures an image of the area surrounding the vehicle from a position not included on the plane including the direction in which the first slit light 111 spreads and the direction in which the first slit light 111 is projected, thereby allowing the first reconstruction unit 4 to use the principle of triangulation. Although not illustrated, the camera 103 captures an image of the area surrounding the vehicle from a position not included on a plane including the direction in which the second slit light 112 spreads and the direction in which the second slit light 112 is projected, thereby allowing the second reconstruction unit 5 to use the principle of triangulation.

FIG. 5 is a diagram illustrating an image captured by the camera 103 in FIG. 4. Pixels hit by the first slit light 111 in this image, that is, a first cutting shape 121 is represented in white.

The first reconstruction unit 4 can calculate the first cutting shape 121 from the principle of triangulation when provided with information related to an installation position and a projection direction of the first light projector 101, an installation position, the angle of view, the center of the lens, and distortion characteristics of the camera 103, and pixels hit by the first slit light 111 in the captured image. Note that it is assumed that the information related to an installation position and a projection direction of the first light projector 101, an installation position, the angle of view, the center of the lens, and distortion characteristics of the camera 103 is set in the first reconstruction unit 4 in advance.

In the example illustrated in FIGS. 4 and 5, in a case where there is no three-dimensional object ahead of the first slit light 111, that is, when the first slit light 111 hits the ground, the first slit light 111 hits a base line 122. On the other hand, in a case where there is a three-dimensional object, the first slit light 111 hits a part above the base line 122 which is apart from the base line by a distance 123 corresponding to the height of the three-dimensional object. Therefore, the first reconstruction unit 4 can reconstruct the outer shape of the area surrounding the vehicle cut by the first slit light 111 by observing the position hit by the first slit light 111 in the captured image. Thereafter the integration unit 8 to be described later reconstructs a three-dimensional shape of the entire area surrounding the vehicle by integrating a plurality of first cutting shapes 121 reconstructed during the travel of the vehicle 100.

The base line 122 indicates a position on a road surface appearing in the captured image. The first reconstruction unit 4 calculates at which position in the image the road surface is placed by using the information related to the installation position and the angle of view of the camera 103, and sets the base line 122 on the basis of the calculated position.

The second reconstruction unit 5 receives the captured image from the imaging unit 3, reconstructs the shape of a part hit by the second slit light 112 from the image, and outputs the reconstructed information to the moving object detecting unit 7. The shape of the part hit by the second slit light 112 and reconstructed by the second reconstruction unit 5 is referred to as a "second cutting shape". Like the first reconstruction unit 4, the second reconstruction unit 5 also reconstructs the second cutting shape by the light-section method or similar methods.

The travel amount calculating unit 6 receives information related to the yaw rate from the yaw rate sensor 105 and information related to the vehicle speed from the vehicle speed sensor 106. Using the received information related to the yaw rate and the vehicle speed, the travel amount calculating unit 6 calculates the travel amount of the vehicle 100 from the following equations (1) and outputs the information of the calculated travel amount of the vehicle 100 to the integration unit 8.

$$\psi(t) = \int \dot{\psi} dt$$

$$X(t) = \int V \cos \psi \, dt$$

$$Y(t) = \int V \sin \psi \, dt \qquad (1)$$

Where, a position of the vehicle 100 after t seconds is expressed as (X(t), Y(t)), the vehicle speed is denoted by V (m/s), and the yaw rate is denoted by $\dot{\psi}$ (rad/s).

The moving object detecting unit 7 receives information of the second cutting shape from the second reconstruction unit 5 and further receives information of the travel amount of the vehicle 100 from the travel amount calculating unit 6. The moving object detecting unit 7 detects a moving object in the area surrounding the vehicle using the second cutting shape reconstructed by the second reconstruction unit 5 and the travel amount of the vehicle 100 calculated by the travel amount calculating unit 6. Specifically, the moving object detecting unit 7 performs, on a second cutting shape obtained at each imaging timing, processing of overlaying a second cutting shape obtained by translating a second cutting shape obtained in the past by a corresponding travel amount of the vehicle 100 from the past to the present on a second cutting shape obtained at the present. In a case where the past and the present second cutting shapes coincide with each other, the moving object detecting unit 7 determines that the object is a stationary object, whereas in a case where they do not coincide with each other, it is determined that the object is a moving object.

Figure 6:
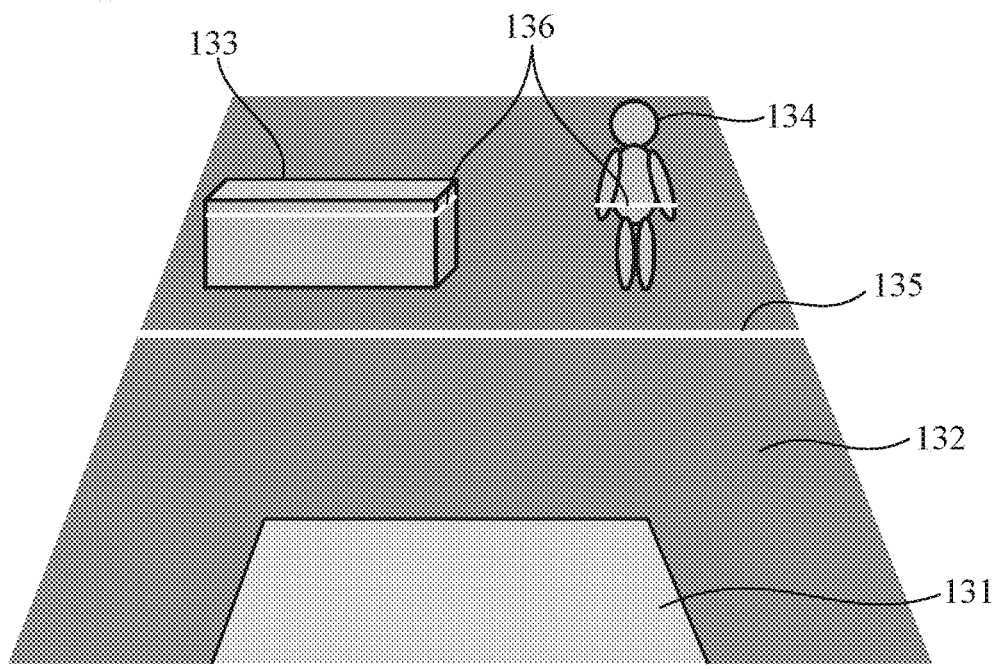
FIG. 6 is a diagram illustrating a state of an area surrounding the vehicle at time t1 when the vehicle gradually travels backward in the first embodiment.
Figure 7:
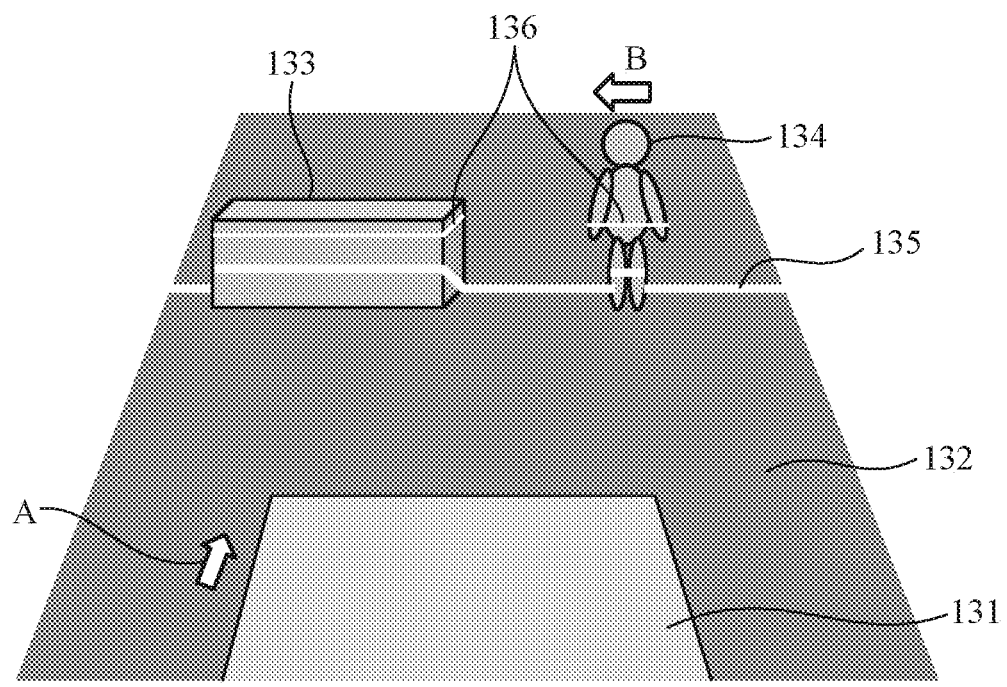
FIG. 7 is a diagram illustrating a state of the area surrounding the vehicle at time t2 when the vehicle gradually travels backward in the first embodiment.
Figure 8:
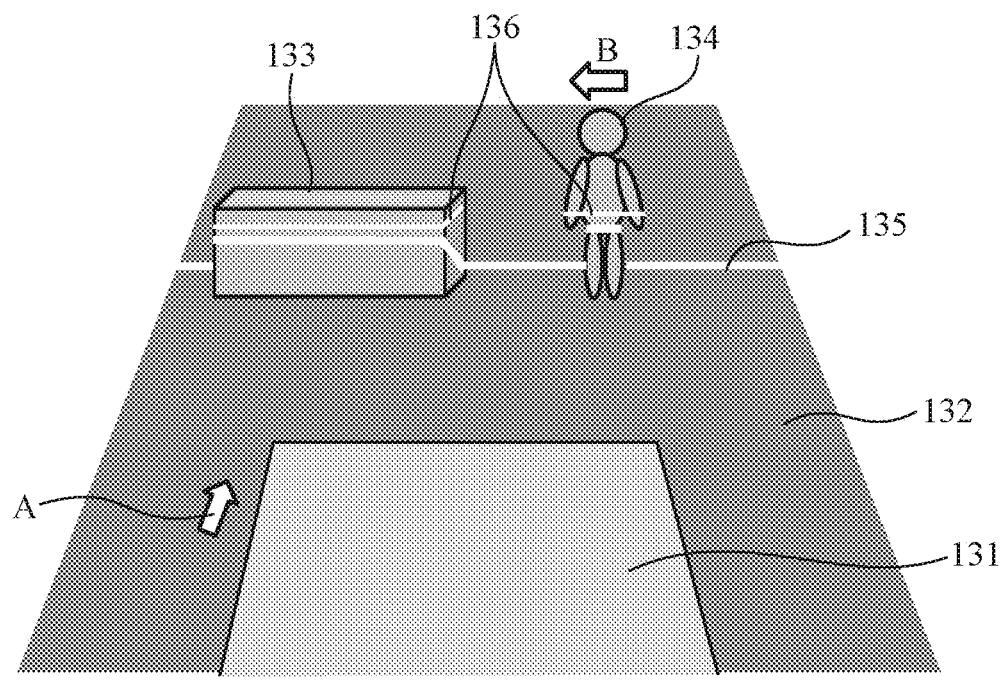
FIG. 8 is a diagram illustrating a state of the area surrounding the vehicle at time t3 when the vehicle gradually travels backward in the first embodiment.

FIGS. 6, 7, and 8 are diagrams illustrating the state behind the vehicle corresponding to the area surrounding the vehicle when the vehicle 100 gradually travels backward. It is assumed that time elapses in the order of time t1, t2, and t3 with FIG. 6 representing the situation at time t1, FIG. 7 representing the situation at time t2, and FIG. 8 representing the situation at time t3. In FIGS. 6, 7, and 8, a roof 131 of the vehicle 100, the ground 132 behind the vehicle 100, a stationary object 133, a moving object 134, a part 135 hit by the first slit light 111, and a part 136 hit by the second slit light 112 are illustrated. The vehicle 100 is travelling backward in the direction of an arrow A. The moving object 134 is moving in the direction of an arrow B. Although a person is illustrated as an example of the moving object 134, this may be a bicycle, another vehicle, or other objects.

As the vehicle 100 travels backward at time t1, t2, and t3, the part 135 hit by the first slit light 111 moves. Furthermore, when the first slit light 111 hits the stationary object 133 and the moving object 134, which are three-dimensional objects, the height of the part 135 hit by the first slit light 111 changes.

Meanwhile, the second slit light 112 spreads in the width direction of the vehicle 100 and is projected in parallel to the ground 132 that is in contact with the vehicle 100, even when the vehicle 100 travels backward, the second slit light 112 always hits the same height. Therefore, the second slit light 112 always hits the same part of the stationary object 133 regardless of the travel of the vehicle 100.

Figure 9:
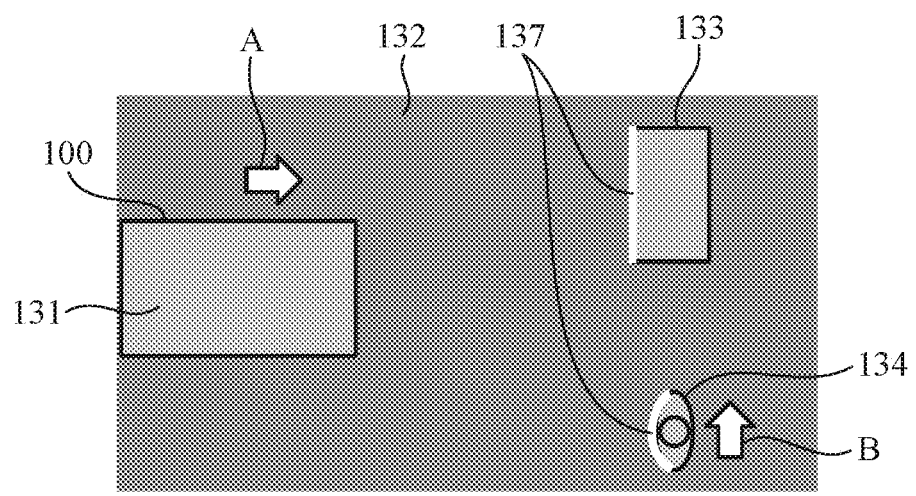
FIG. 9 is a diagram illustrating a second cutting shape reconstructed from an image captured under the situation at time t1.
Figure 10:
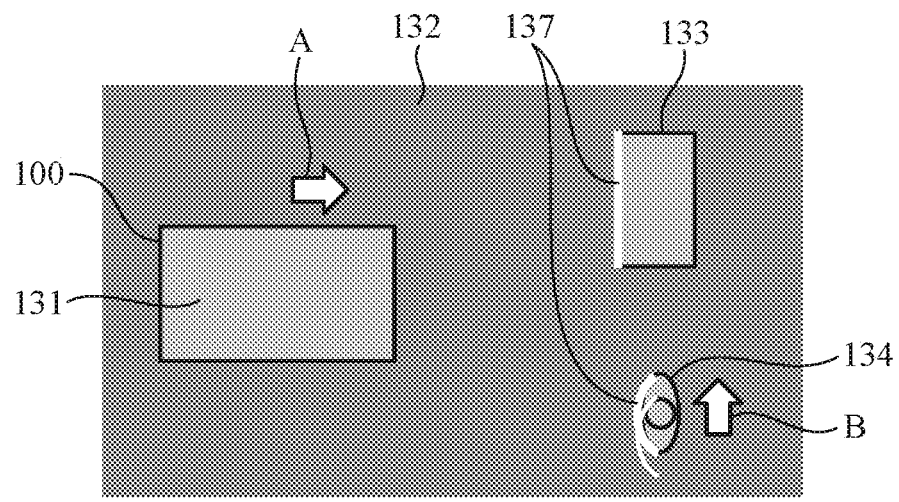
FIG. 10 is a diagram illustrating second cutting shapes reconstructed from images captured under the situations at time t1 and t2 in a superimposed manner.
Figure 11:
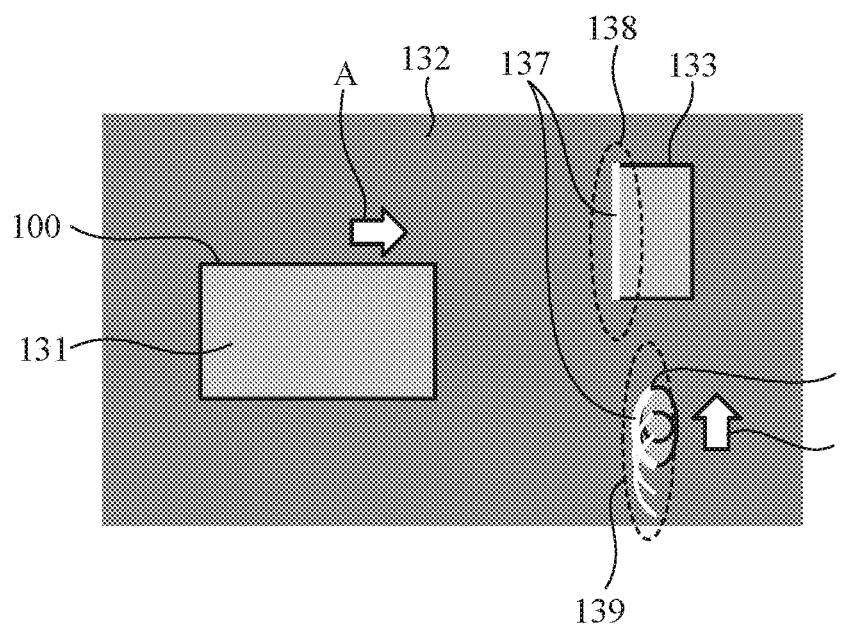
FIG. 11 is a diagram illustrating second cutting shapes reconstructed from images captured under the situations at time t1 to t3 in a superimposed manner.

FIGS. 9, 10, and 11 are diagrams illustrating transition of the second cutting shapes 137 reconstructed from the respective images captured under the situations illustrated in FIGS. 6, 7, and 8.

FIG. 9 is a diagram illustrating a second cutting shape 137 reconstructed by the second reconstruction unit 5 using the image captured under the situation at time t1 illustrated in FIG. 6. In FIG. 9, out of the part hit by the second slit light 112, parts in which the second slit light hits the stationary object 133 and the moving object 134 are reconstructed as the second cutting shape 137.

FIG. 10 is a diagram illustrating a second cutting shape 137 reconstructed by the second reconstruction unit 5 using the image captured under the situation at time t2 illustrated in FIG. 7. In FIG. 10, the second cutting shape 137 reconstructed using the image captured under the situation at time t1 illustrated in FIG. 6 is illustrated while superimposed on the second cutting shape 137 reconstructed using the image captured under the situation at time t2 illustrated in FIG. 7. The moving object detecting unit 7 translates the second cutting shape 137 obtained at the past time t1 by the travel amount of the vehicle 100 and superimposes the second cutting shape 137 on the second cutting shape 137 newly obtained at time t2.

FIG. 11 is a diagram illustrating a second cutting shape 137 reconstructed by the second reconstruction unit 5 using the image captured under the situation at time t3 illustrated in FIG. 8. In FIG. 11, the two second cutting shapes 137 reconstructed using the respective images captured under the situations at time t1 and t2 illustrated in FIGS. 6 and 7 are illustrated while superimposed on the second cutting shape 137 reconstructed using the image captured under the situation at time t3 illustrated in FIG. 8.

In FIG. 11, a part 138 representing the stationary object 133 out of the second cutting shape 137 is always superimposed at the same position irrespective of the backward travel of the vehicle 10), and thus the moving object detecting unit 7 determines this part 138 as a stationary three-dimensional object.

On the other hand, the moving object 134 is moving at the same time as the vehicle 100 travels backward. Therefore, after translation by the travel amount of the vehicle 100 and superimposition, parts 139 representing the moving object 134 out of the second cutting shapes 137 do not coincide with each other. Therefore, the moving object detecting unit 7 detects these non-coinciding parts 139 as a moving object.

The integration unit 8 receives the information of the first cutting shapes from the first reconstruction unit 4, the information of the travel amount of the vehicle 100 from the travel amount calculating unit 6, and the information of the moving object from the moving object detecting unit 7. Using the travel amount of the vehicle 100 calculated by the travel amount calculating unit 6 and the information of the moving object detected by the moving object detecting unit 7, the integration unit 8 integrates the first cutting shapes reconstructed by the first reconstruction unit 4 and thereby reconstructs a three-dimensional shape of the area surrounding the vehicle. Specifically, the integration unit 8 performs, on a first cutting shape obtained at each imaging timing, processing of overlaying a first cutting shape obtained by translating a first cutting shape obtained in the past by a corresponding travel amount of the vehicle 100 from the past to the present on a first cutting shape obtained at the present and thereby integrates a plurality of first cutting shapes and reconstructs the three-dimensional shape of the area surrounding the vehicle. Note that the integration unit 8 also correctly reconstructs a three-dimensional shape of the moving object in the area surrounding the vehicle by performing processing of overlaying first cutting shapes in the area where the moving object has been detected by the moving object detecting unit 7 while moving each of the first cutting shapes depending on a corresponding travel amount of the moving object from the past to the present. Note that the integration unit 8 calculates a difference between the position of the moving object detected by the moving object detecting unit 7 from the past captured image and the position of the moving object detected from the current captured image and regards the result as a travel amount of the moving object from the past to the present.

Figure 12:
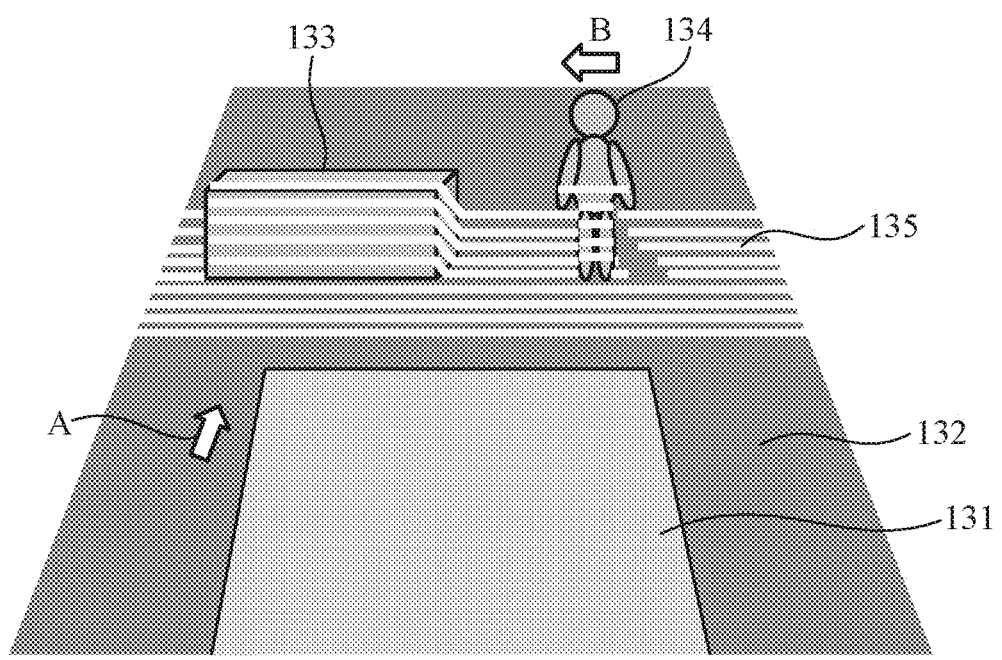
FIG. 12 is a diagram illustrating a three-dimensional shape reconstructed by an integration unit of the obstacle detection device according to the first embodiment.

FIG. 12 is a diagram illustrating a three-dimensional shape reconstructed by the integration unit 8. The part 135 hit by the first slit light 111 moves from the bottom to the top on the paper surface of FIG. 12 along with the backward travel of the vehicle 100. Each of the first cutting shapes whose position changes along with the backward travel of the vehicle 100 is superimposed in consideration of the corresponding travel amount of the vehicle 100, and the three-dimensional shape of the area surrounding the vehicle is reconstructed. At that time, since each of the parts representing the moving object 134 out of the first cutting shapes is superimposed in consideration of the corresponding travel amount of the moving object 134, a three-dimensional shape of the moving object 134 is also correctly reconstructed.

Note that in this example, the example in which the moving object 134 moving in the width direction of the vehicle 100 is detected has been described; however, it is also possible to detect a moving object moving in the front-rear direction of the vehicle 100. For example, in the case of a moving object approaching the vehicle 100, a second cutting shape of the moving object approaches the vehicle 100 with a travel amount larger than the travel amount of the vehicle 100. Therefore, in a case where the second reconstruction unit 5 performs processing of translating a past second cutting shape by the travel amount of the vehicle 100 and overlaying the second cutting shape on a current second cutting shape, the second cutting shapes of the past and the present do not coincide with each other, and the current second cutting shape is located closer to the vehicle 100.

The obstacle detection unit 9 receives information of the three-dimensional shape from the integration unit 8. The obstacle detection unit 9 detects an obstacle using the three-dimensional shape reconstructed by the integration unit 8. Specifically, the obstacle detection unit 9 detects, as an obstacle, a three-dimensional object having a height, which is not a road surface, out of the reconstructed three-dimensional shape of the area surrounding the vehicle. In the three-dimensional shape illustrated in FIG. 12, the stationary object 133 and the moving object 134 are detected as obstacles. Note that it suffices that the obstacle detection unit 9 calculates the position of a road surface in a similar manner to that of the first reconstruction unit 4 and detects a three-dimensional object higher than the road surface as an obstacle.

Figure 13:
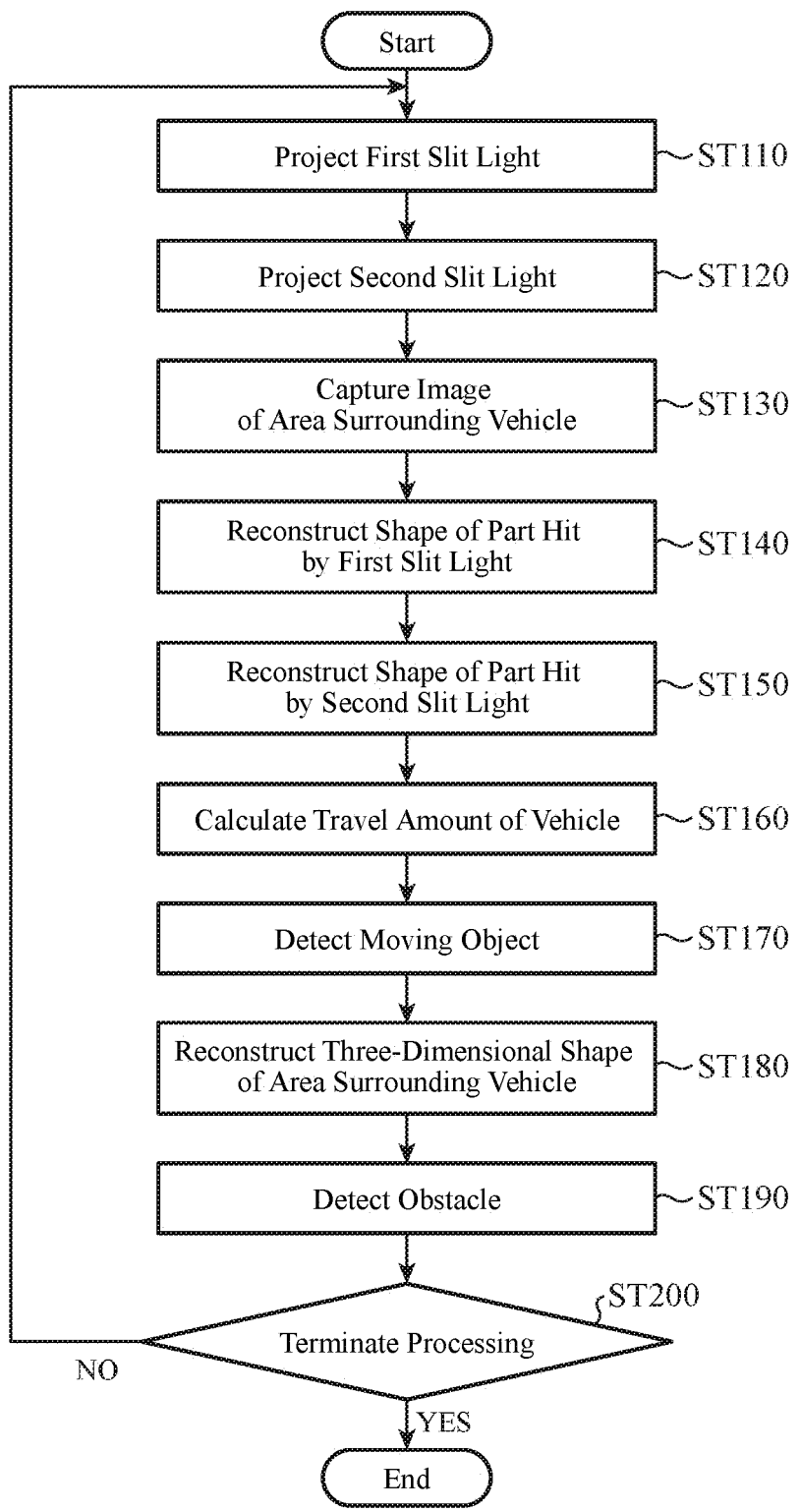
FIG. 13 is a flowchart illustrating an example of processing in the obstacle detection device according to the first embodiment.

FIG. 13 is a flowchart illustrating an example of processing in the obstacle detection device according to the first embodiment. First, in step ST110, the first light projecting unit 1 projects the first slit light to the area surrounding the vehicle. Next, in step ST120, the second light projecting unit 2 projects the second slit light to the area surrounding the vehicle. Next, in step ST130, the imaging unit 3 captures an image of the area surrounding the vehicle. Next, in step ST140, the first reconstruction unit 4 reconstructs the shape of the part hit by the first slit light. Next, in step ST150, the second reconstruction unit 5 reconstructs the shape of the part hit by the second slit light. Next, in step ST160, the travel amount calculating unit 6 calculates the travel amount of the vehicle. Next, in step ST170, the moving object detecting unit 7 detects a moving object in the area surrounding the vehicle. Next, in step ST180, the integration unit 8 integrates the shapes reconstructed by the first reconstruction unit 4 to reconstruct a three-dimensional shape of the area surrounding the vehicle. Next, in step ST190, the obstacle detection unit 9 detects an obstacle using the three-dimensional shape reconstructed by the integration unit 8. Next, in step ST200, the obstacle detection unit 9 determines whether to terminate the processing. In a case where the processing is not terminated, the processing returns to the process of step ST110.

As described above, the obstacle detection device according to the first embodiment includes: the first light projecting unit 1 for projecting the first slit light toward an area surrounding a vehicle; the second light projecting unit 2 for projecting the second slit light that spreads in a width direction of the vehicle toward the area surrounding the vehicle in a direction parallel to a contact ground surface on the vehicle; the imaging unit 3 for capturing an image of the area surrounding the vehicle from a position not included on either a plane including a direction in which the first slit light spreads and a direction in which the first slit light is projected or a plane including the direction in which the second slit light spreads and the direction in which the second slit light is projected; the first reconstruction unit 4 for reconstructing a shape of a part hit by the first slit light using the image captured by the imaging unit 3; the second reconstruction unit 5 for reconstructing a shape of a part hit by the second slit light using the image captured by the imaging unit 3; the travel amount calculating unit 6 for calculating a travel amount of the vehicle; the moving object detecting unit 7 for detecting a moving object in the area surrounding the vehicle using the shape reconstructed by the second reconstruction unit 5 and the travel amount of the vehicle calculated by the travel amount calculating unit 6; the integration unit 8 for reconstructing a three-dimensional shape of the area surrounding the vehicle by integrating the shapes reconstructed by the second reconstruction unit 5 using the travel amount of the vehicle calculated by the travel amount calculating unit 6 and information of the moving object detected by the moving object detecting unit 7; and the obstacle detection unit 9 for detecting an obstacle using the three-dimensional shape reconstructed by the integration unit 8. With this configuration, even when a moving object is present, it is possible to correctly reconstruct the three-dimensional shape of the area surrounding the vehicle, thereby enabling detection of an obstacle using the three-dimensional shape.

Furthermore, according to the first embodiment, the first slit light spreads in the width direction of the vehicle and is projected in a direction other than the direction parallel to the contact ground surface on the vehicle. As a result, it is possible to scan an area behind the vehicle with the slit light along with the travel of the vehicle, thereby enabling reconstruction of a three-dimensional shape of a wide range. This enables detection of an obstacle during parking.

Note that, in the first embodiment, the first light projecting unit 1 for projecting the first slit light and the second light projecting unit 2 for projecting the second slit light are installed on the rear surface of the vehicle; however, the first light projecting unit 1 and the second light projecting unit 2 may be installed on the front surface of the vehicle. Furthermore, the first slit light and the second slit light are projected in the backward travelling direction of the vehicle in the first embodiment; however, the first slit light and the second slit light may be projected in the forward travelling direction of the vehicle. With the above configuration, the obstacle detection device can scan an area ahead of the vehicle with slit light.

Second Embodiment

In the first embodiment, the embodiment assuming an obstacle detection device that detects an obstacle in at least one of the rear side of the vehicle and the front side of the vehicle has been described; however in a second embodiment, an obstacle detection device for detecting an obstacle in at least one of a left side of a vehicle and a right side of the vehicle will be described.

Figure 14:
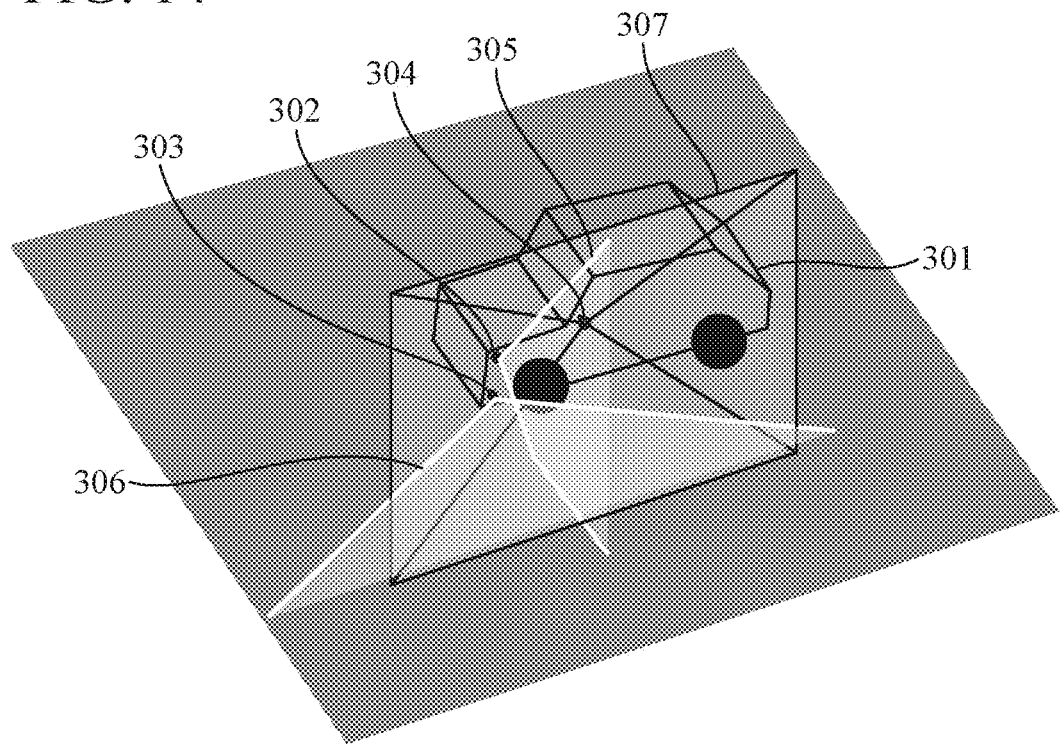
FIG. 14 is a diagram illustrating a vehicle on which an obstacle detection device according to a second embodiment of the present invention is mounted.

FIG. 14 is a diagram illustrating a vehicle 301 on which an obstacle detection device according to the second embodiment of the present invention is mounted. As illustrated in FIG. 14, a first light projector 302, a second light projector 303, and a camera 304 are mounted on a side part of the vehicle 301.

The first light projector 302 projects first slit light 305 that spreads in the vertical direction perpendicular to a contact ground surface in contact with the vehicle 301, from a left side surface of the vehicle 301 in a left direction. The first slit light 305 spreads little in a direction parallel to the contact ground surface.

The second light projector 303 projects second slit light 306 that spreads in the front-rear direction of the vehicle 301, that is, spreading in a planar shape parallel to the contact ground surface, from the left side surface of the vehicle 301 in the left direction. The second slit light 306 spreads little in the vertical direction perpendicular to the contact ground surface. The front-rear direction of the vehicle 301 refers to the forward and backward travelling direction of the vehicle 301 when the vehicle is viewed from above.

The camera 304 for capturing an image of the imaging area 307 is installed at a position different from those of the first light projector 302 and the second light projector 303 of the vehicle 301. In the example of FIG. 14, the camera 304 is installed at a height different from those of the first light projector 302 and the second light projector 303. Moreover, the camera 304 is installed at an angle allowing the camera 304 to capture an image of an area surrounding the vehicle where the first slit light 305 and the second slit light 306 are projected. In FIG. 14, the area surrounding the vehicle corresponds to an area on the left side of the vehicle 301.

Since a functional block diagram of the obstacle detection device according to the second embodiment has the same configuration as that of FIG. 3 which is the functional block diagram of the first embodiment, and contents of processing are also the same, detailed descriptions are omitted. Note that the first light projector 302, the second light projector 303, and the camera 304 in FIG. 14 correspond to the first light projecting unit 1, the second light projecting unit 2, and the imaging unit 3 in FIG. 3.

Hereinafter, the contents of processing performed by the moving object detecting unit 7 and the integration unit 8 in the second embodiment will be described with an example in which there are a stationary object and a moving object on the left side of the vehicle.

Figure 15:
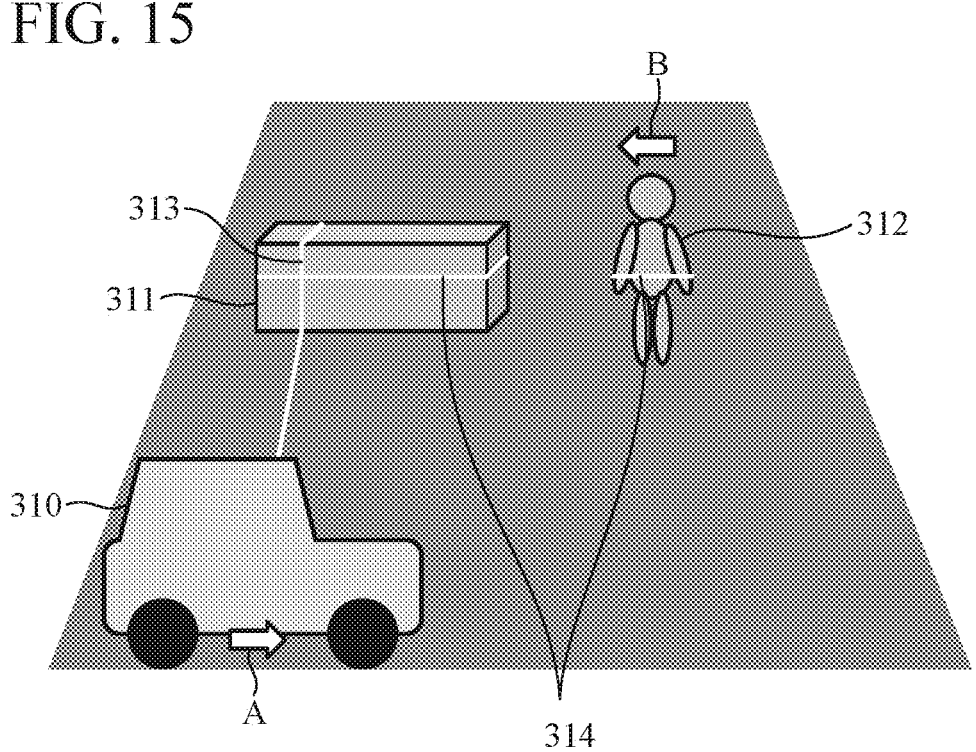
FIG. 15 is a diagram illustrating a state of an area surrounding a vehicle at time t1 when the vehicle gradually travels forward in the second embodiment.
Figure 16:
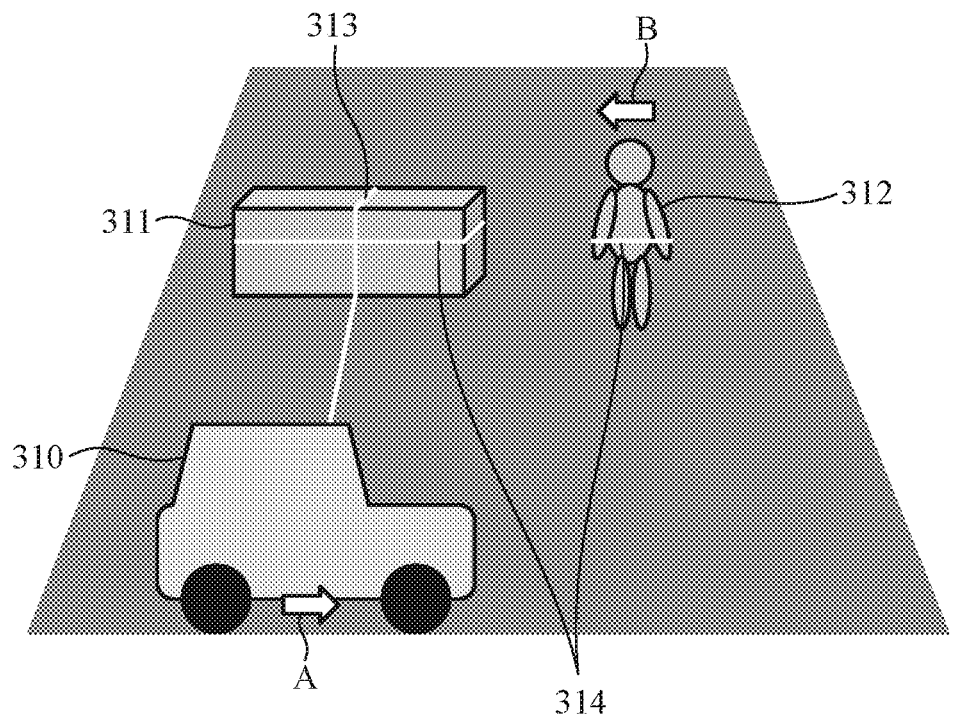
FIG. 16 is a diagram illustrating a state of the area surrounding the vehicle at time t2 when the vehicle gradually travels forward in the second embodiment.
Figure 17:
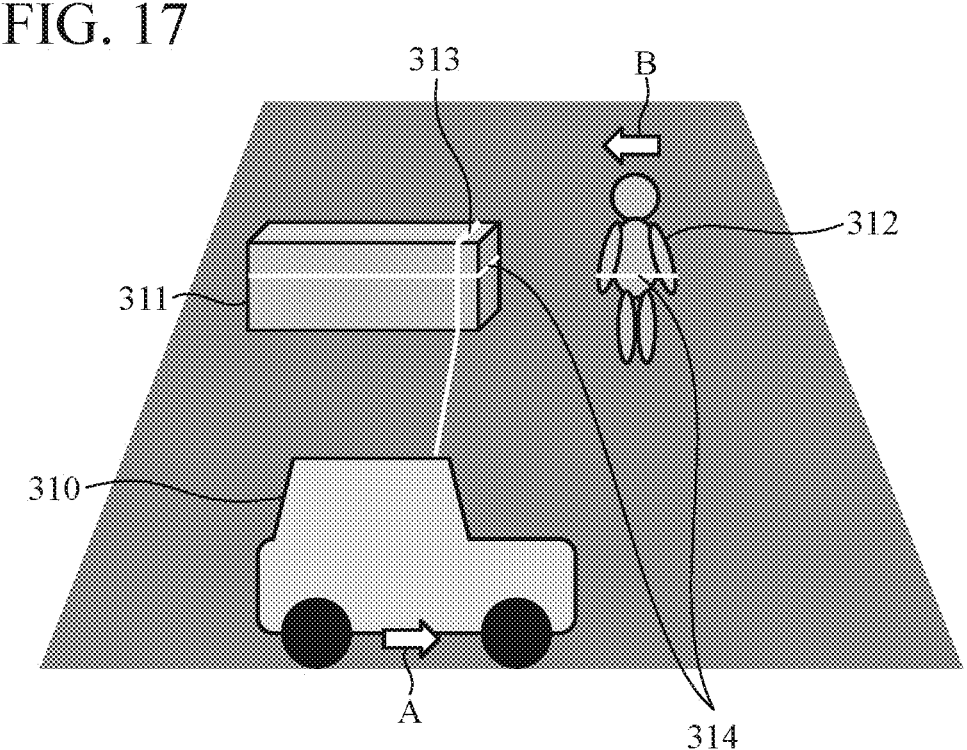
FIG. 17 is a diagram illustrating a state of the area surrounding the vehicle at time t3 when the vehicle gradually travels forward in the second embodiment.
Figure 18:
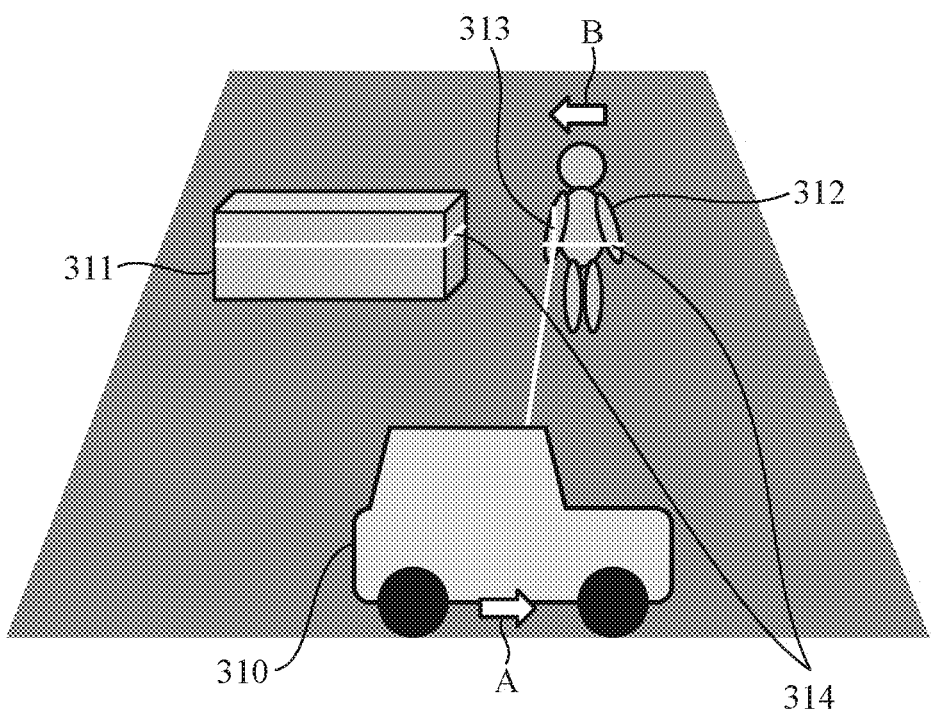
FIG. 18 is a diagram illustrating a state of the area surrounding the vehicle at time t4 when the vehicle gradually travels forward in the second embodiment.
Figure 19:
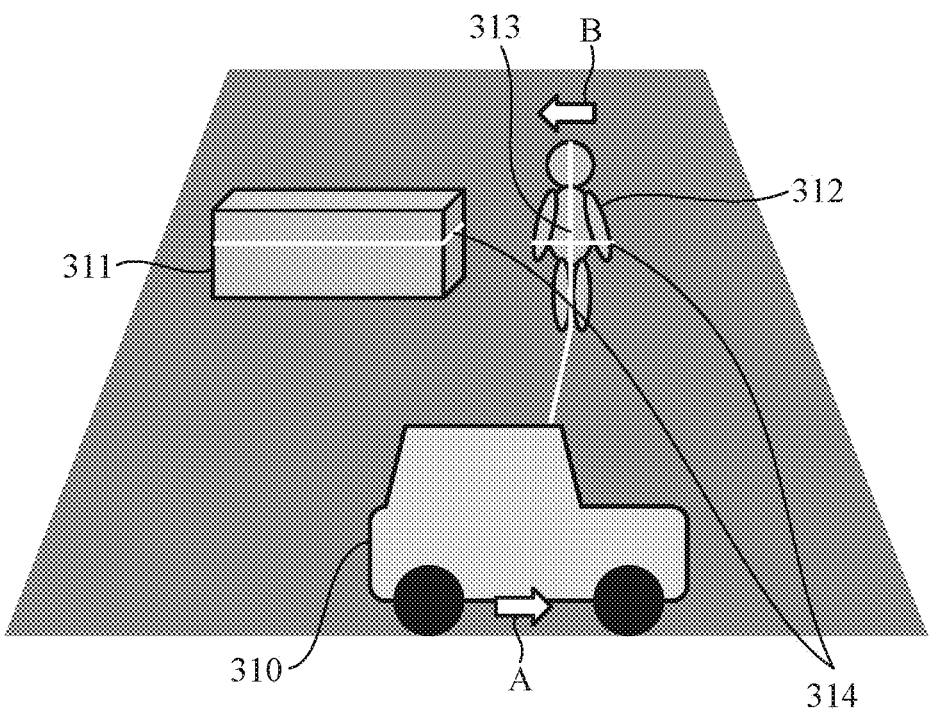
FIG. 19 is a diagram illustrating a state of the area surrounding the vehicle at time t5 when the vehicle gradually travels forward in the second embodiment.
Figure 20:
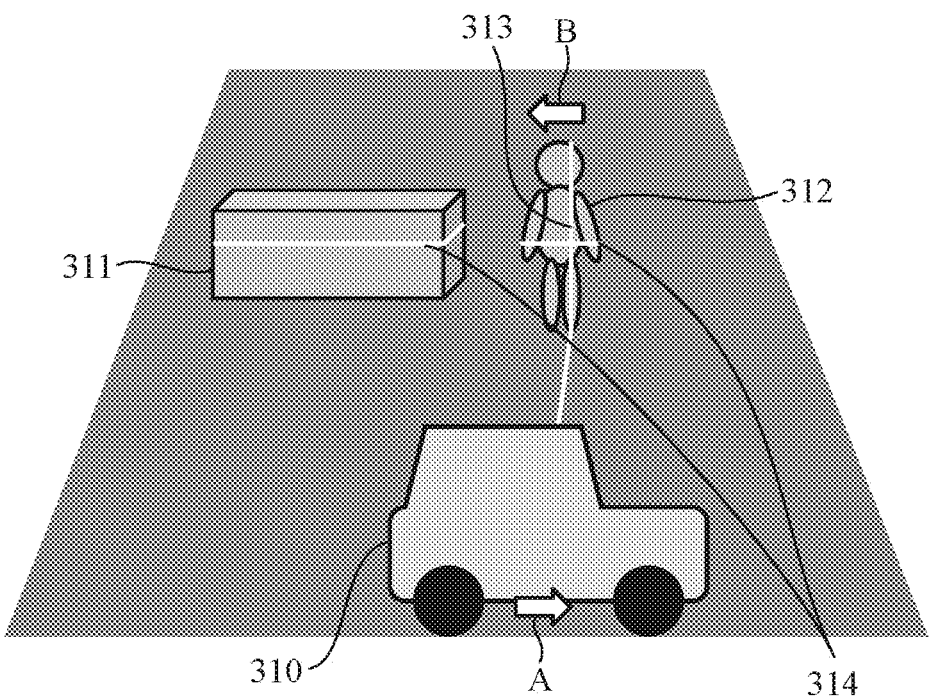
FIG. 20 is a diagram illustrating a state of the area surrounding the vehicle at time t6 when the vehicle gradually travels forward in the second embodiment.

FIGS. 15, 16, 17, 18, 19, and 20 are diagrams illustrating the state on the left side of the vehicle corresponding to the area surrounding the vehicle when the vehicle 310 gradually travels forward. It is assumed that time elapses in the order of time t1, t2, t3, t4, t5, and t6 with FIG. 15 representing the situation at time t1, FIG. 16 representing the situation at time t2, FIG. 17 representing the situation at time t3, FIG. 18 representing the situation at time t4, FIG. 19 representing the situation at time t5, and FIG. 20 representing the situation at time t6. In FIGS. 15 to 20, the vehicle 310, a stationary object 311, a moving object 312, a part 313 hit by the first slit light 305, and a part 314 hit by the second slit light 306 are illustrated. The vehicle 310 is travelling forward in the direction of an arrow A. The moving object 312 is travelling in the direction of an arrow B. Although a person is illustrated as an example of the moving object 312, this may be a bicycle, another vehicle, or other objects.

As time t1, t2, t3, t4, t5, and t6 elapses, the part 313 hit by the first slit light 305 gradually moves.

Meanwhile, the second slit light 306 spreads in the front-rear direction of the vehicle 310, that is, spreads in a planar shape parallel to the contact ground surface and is projected in parallel to the ground that is in contact with the vehicle 310, and thus even when the vehicle 310 travels forward, the second slit light 306 always hits the same part. Therefore, the second slit light 306 always hits the same part of the stationary object 311 regardless of the travel of the vehicle 310. Likewise, the second slit light 306 always hits the same part of the moving object 312 regardless of the travel of the vehicle 310 and the moving object 312.

FIGS. 21, 22, 23, 24, 25 and 26 are diagrams illustrating transition of first cutting shapes 315 and second cutting shapes 316 reconstructed from respective images captured at time t1, t2, t3, t4, t5, and t6 illustrated in FIGS. 15 to 20. FIGS. 21 to 26 are diagrams of the area in which the stationary object 311 and the moving object 312 are present when viewed directly downward from above.

Figure 21:
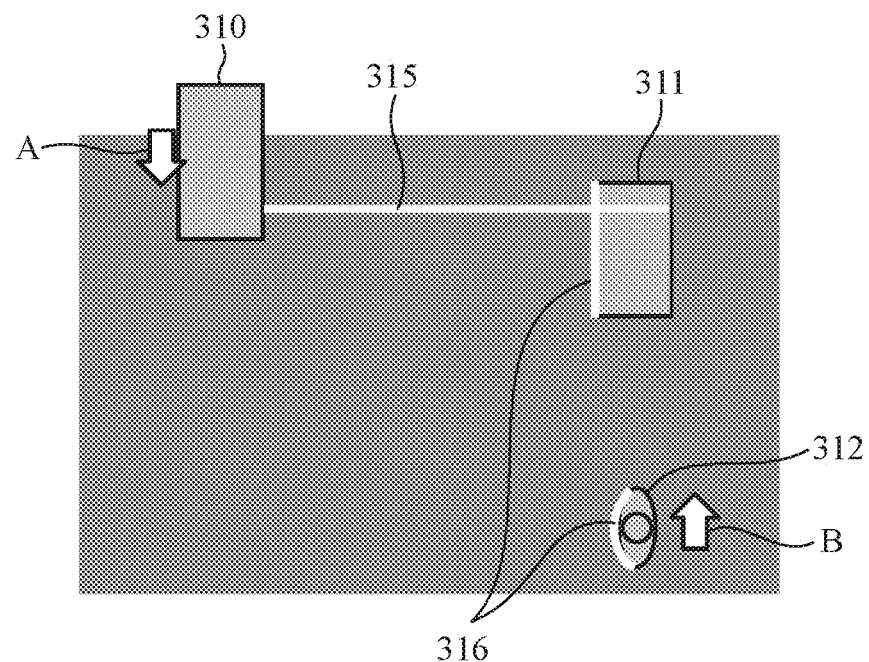
FIG. 21 is a diagram illustrating a second cutting shape reconstructed from an image captured under the situation at time t1.

FIG. 21 is a diagram illustrating a first cutting shape 315 reconstructed by the first reconstruction unit 4 and a second cutting shape 316 reconstructed by the second reconstruction unit 5 by using the image captured under the situation at time t1 illustrated in FIG. 15. In FIG. 21, the part 313 hit by the first slit light 305 is reconstructed as the first cutting shape 315. Moreover, out of the part 314 hit by the second slit light 306, parts in which the second slit light hits the stationary object 311 and the moving object 312 are reconstructed as the second cutting shape 316.

Figure 22:
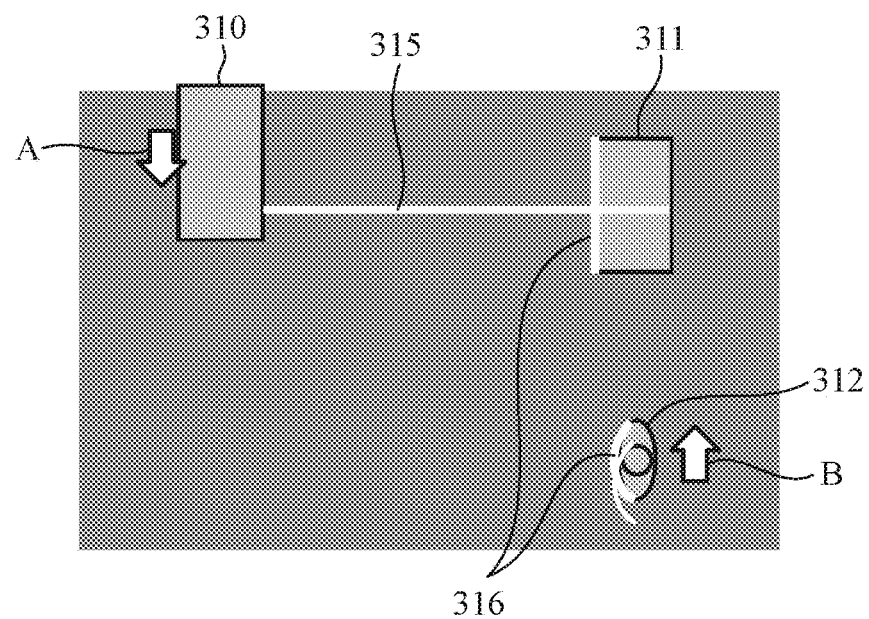
FIG. 22 is a diagram illustrating second cutting shapes reconstructed from images captured under the situations at time t1 and t2 in a superimposed manner.

FIG. 22 is a diagram illustrating a first cutting shape 315 reconstructed by the first reconstruction unit 4 and a second cutting shape 316 reconstructed by the second reconstruction unit 5 by using the image captured under the situation at time t2 illustrated in FIG. 16. In FIG. 22, the second cutting shape 316 reconstructed using the image captured under the situation at time t1 illustrated in FIG. 15 is illustrated while superimposed on the second cutting shape 316 reconstructed using the image captured under the situation at time t2 illustrated in FIG. 16. The moving object detecting unit 7 translates the second cutting shape 316 obtained at the past time t1 by a travel amount of the vehicle 310 and superimposes the second cutting shape 316 on the second cutting shape 316 newly obtained at time t2.

Figure 23:
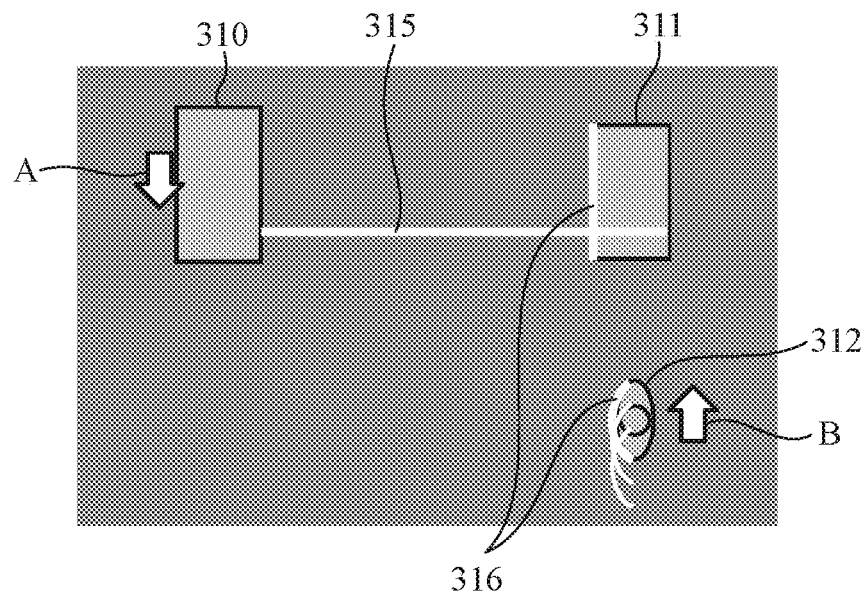
FIG. 23 is a diagram illustrating second cutting shapes reconstructed from images captured under the situations at time t1 to t3 in a superimposed manner.
Figure 24:
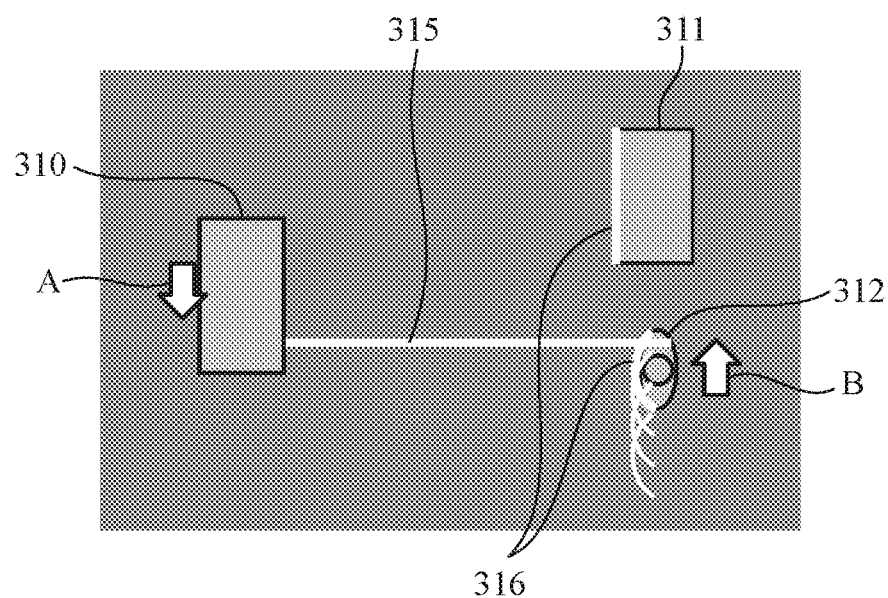
FIG. 24 is a diagram illustrating second cutting shapes reconstructed from images captured under the situations at time t1 to t4 in a superimposed manner.
Figure 25:
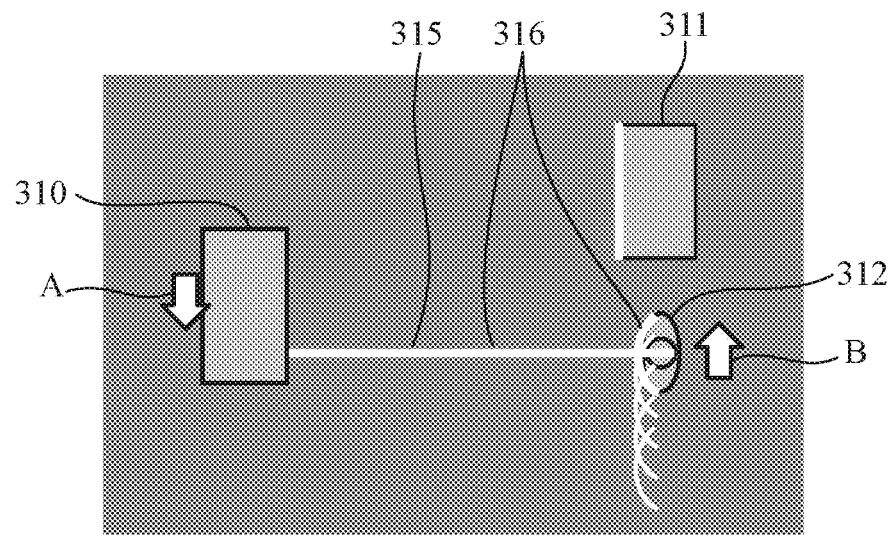
FIG. 25 is a diagram illustrating second cutting shapes reconstructed from images captured under the situations at time t1 to t5 in a superimposed manner.

Similarly, in FIGS. 23 to 25, the moving object detecting unit 7 translates each of the second cutting shapes 316 obtained at the past time t1 and t2 by the corresponding travel amount of the vehicle 310 and superimposes the second cutting shapes 316 on second cutting shapes 316 newly obtained at time t3, t4, and t5.

Figure 26:
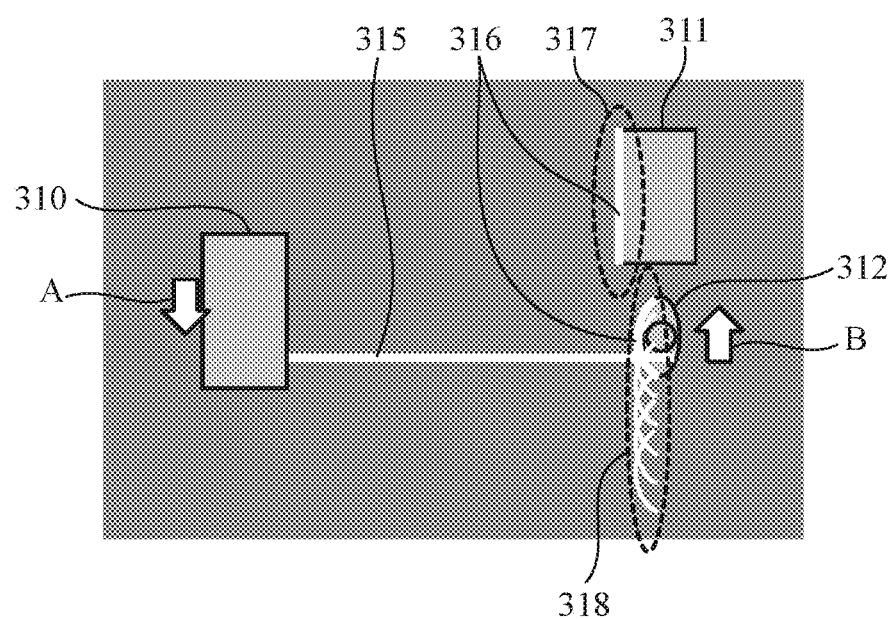
FIG. 26 is a diagram illustrating second cutting shapes reconstructed from images captured under the situations at time t1 to t6 in a superimposed manner.

FIG. 26 is a diagram illustrating a first cutting shape 315 reconstructed by the first reconstruction unit 4 and a second cutting shape 316 reconstructed by the second reconstruction unit 5 by using the image captured under the situation at time t6 illustrated in FIG. 20. In FIG. 26, the five second cutting shapes 316 reconstructed using the respective images captured under the situations at time t1 to t5 illustrated in FIGS. 15 to 19 are illustrated while superimposed on the second cutting shape 316 reconstructed using the image captured under the situation at time t6 illustrated in FIG. 20.

In FIG. 26, a part 317 representing the stationary object 311 out of the second cutting shape 316 is always superimposed at the same position irrespective of the forward travel of the vehicle 310, and thus the moving object detecting unit 7 determines this part 317 as a stationary three-dimensional object.

On the other hand, the moving object 312 is moving at the same time as the vehicle 310 travels forward. Therefore, after translation by the travel amount of the vehicle 310 and superimposition, parts 318 representing the moving object 312 out of the second cutting shapes 316 do not coincide with each other. Therefore, the moving object detecting unit 7 detects these non-coinciding parts 318 as a moving object.

The integration unit 8 receives the information of the first cutting shapes from the first reconstruction unit 4, the information of the travel amount of the vehicle 310 from the travel amount calculating unit 6, and the information of the moving object from the moving object detecting unit 7. Using the travel amount of the vehicle 310 calculated by the travel amount calculating unit 6 and the information of the moving object detected by the moving object detecting unit 7, the integration unit 8 integrates the first cutting shapes reconstructed by the first reconstruction unit 4 and thereby reconstructs a three-dimensional shape of the area surrounding the vehicle on the left of the vehicle. Specifically, the integration unit 8 performs, on a first cutting shape obtained at each imaging timing, processing of overlaying a first cutting shape obtained by translating a first cutting shape obtained in the past by a corresponding travel amount of the vehicle 310 from the past to the present on a first cutting shape obtained at the present and thereby integrates a plurality of first cutting shapes and reconstructs the three-dimensional shape of the area surrounding the vehicle. Note that the integration unit 8 also correctly reconstructs a three-dimensional shape of the moving object in the area surrounding the vehicle by performing processing of overlaying first cutting shapes in the area where the moving object has been detected by the moving object detecting unit 7 while moving each of the first cutting shapes depending on a corresponding travel amount of the moving object from the past to the present. Note that the integration unit 8 calculates a difference between the position of the moving object detected by the moving object detecting unit 7 from the past captured image and the position of the moving object detected from the current captured image and regards the result as a travel amount of the moving object from the past to the present.

Figure 27:
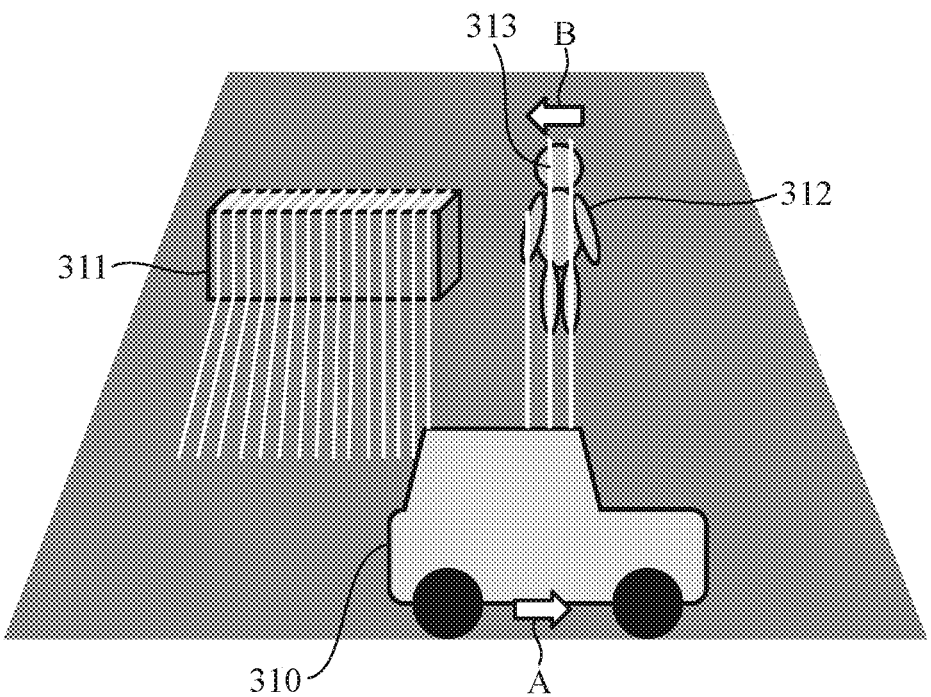
FIG. 27 is a diagram illustrating a three-dimensional shape reconstructed by an integration unit of the obstacle detection device according to the second embodiment.

FIG. 27 is a diagram illustrating a three-dimensional shape reconstructed by the integration unit 8. The part 313 hit by the first slit light 305 moves from the left to the right on the paper surface of FIG. 27 along with the forward travel of the vehicle 310. Each of the first cutting shapes whose position changes along with the forward travel of the vehicle 310 is superimposed in consideration of the corresponding travel amount of the vehicle 310, and the three-dimensional shape of the area surrounding the vehicle is reconstructed. At that time, since each of the parts representing the moving object 312 out of the first cutting shapes is superimposed in consideration of the corresponding travel amount of the moving object 312, a three-dimensional shape of the moving object 312 is also correctly reconstructed.

Figure 28:
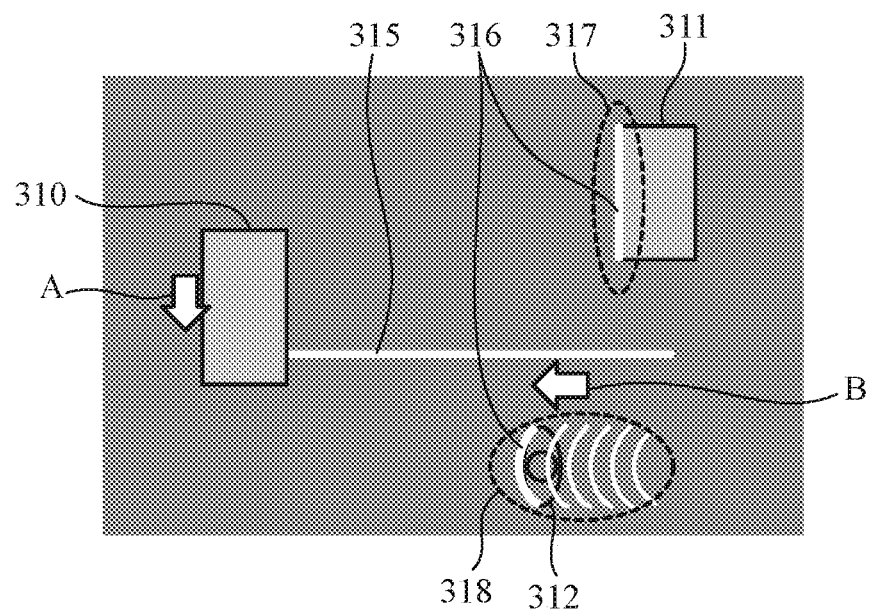
FIG. 28 is a diagram explaining an example of detection of a moving object approaching the vehicle in the second embodiment.

Note that in this example, the example in which the moving object 312 moving in the front-rear direction of the vehicle 310 is detected has been described; however, it is also possible to detect a moving object moving in the right-left direction of the vehicle 310. Here, an example of detection of the moving object 312 approaching the vehicle 310 in the second embodiment is illustrated in FIG. 28. For example in the case of the moving object 312 approaching the vehicle 310 by moving in the direction of an arrow B, a second cutting shape of the moving object 312 moves in a direction different from the travelling direction of the vehicle 310 and approaches the vehicle 310. Therefore, in a case where the second reconstruction unit 5 performs processing of translating a past second cutting shape by the travel amount of the vehicle 310 and overlaying the second cutting shape on a current second cutting shape, the second cutting shapes of the past and the present do not coincide with each other, and the current second cutting shape is located closer to the vehicle 310.

Like the obstacle detection device according to the first embodiment, as described above, the obstacle detection device according to the second embodiment can correctly reconstruct the three-dimensional shape of the area surrounding the vehicle and detect an obstacle using the three-dimensional shape even when a moving object is present.

Furthermore, according to the second embodiment, the first slit light spreads in the vertical direction and is projected leftward from a side surface of the vehicle. As a result, it is possible to scan an area on the left of the vehicle with the slit light along with the travel of the vehicle, thereby enabling reconstruction of a three-dimensional shape of a wide range. Therefore, for example, it is possible to determine whether there is a parking space at the time of parallel parking, and at that time it is also possible to determine whether a moving object is present in the parking space.

Note that, in the second embodiment, the first light projecting unit 1 for projecting the first slit light and the second light projecting unit 2 for projecting the second slit light are installed on the left side surface of the vehicle; however, the first light projecting unit 1 and the second light projecting unit 2 may be installed on the right side surface of the vehicle. Furthermore, the first slit light and the second slit light are projected in the left direction of the vehicle in the second embodiment; however, the first slit light and the second slit light may be projected in the right direction of the vehicle. With the above configuration, the obstacle detection device can scan an area on the right of the vehicle with slit light.

Furthermore, the first slit light is projected in the left direction of the vehicle in the second embodiment; however, the first slit light may be projected in a diagonally forward left direction, a diagonally backward left direction, a diagonally forward right direction, or a diagonally backward right direction of the vehicle.

Furthermore, the obstacle detection device of the first embodiment and the obstacle detection device of the second embodiment can be combined. In this case, the obstacle detection device can detect an obstacle in at least one of the front side and the rear side of the vehicle and at least one of the left direction and the right direction of the vehicle.

Third Embodiment

Figure 29:
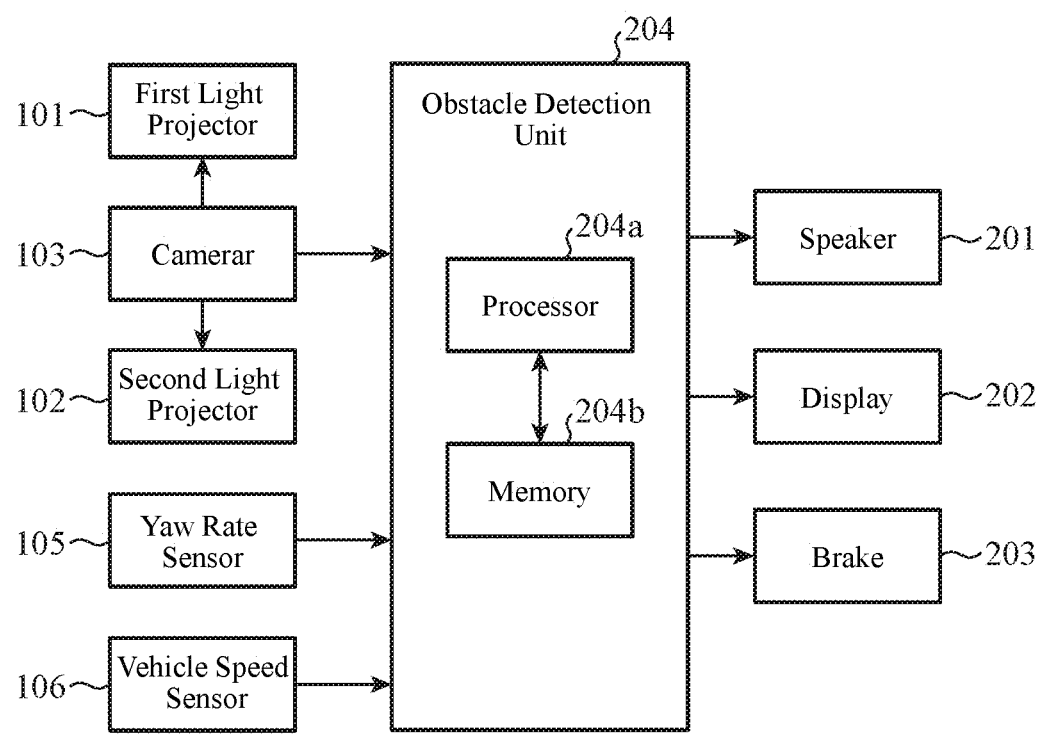
FIG. 29 is a hardware configuration diagram of a driving assistance system for which an obstacle detection device according to a third embodiment of the present invention is used.
Figure 30:
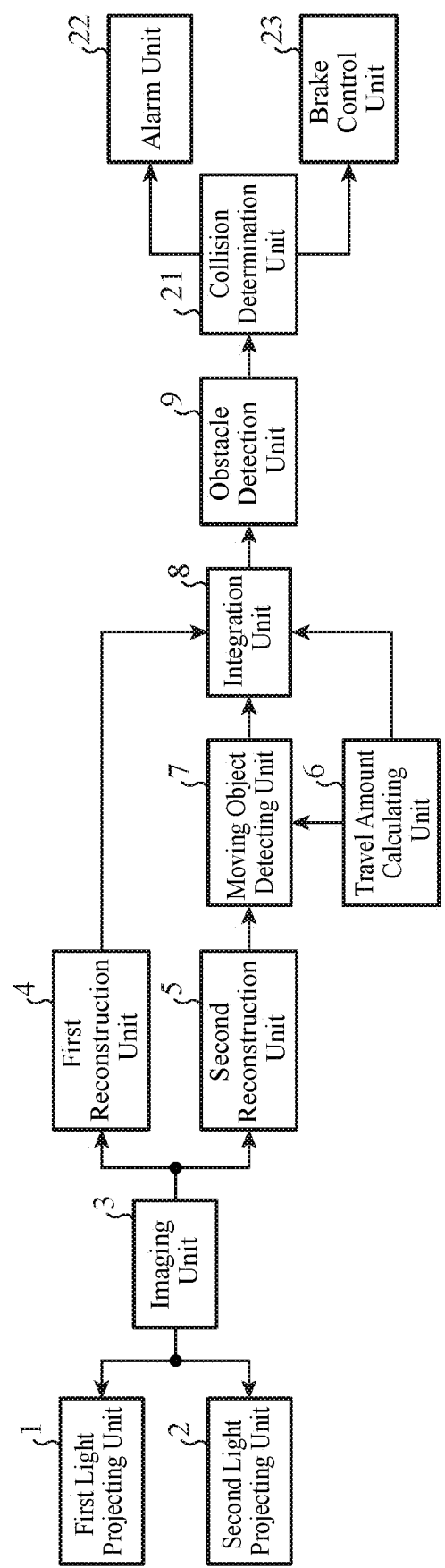
FIG. 30 is a functional block diagram of the driving assistance system for which the obstacle detection device according to the third embodiment is used.

FIG. 29 is a hardware configuration diagram of a driving assistance system for which an obstacle detection device according to a third embodiment of the present invention is used. In addition. FIG. 30 is a functional block diagram of the driving assistance system for which the obstacle detection device according to the third embodiment is used. In FIGS. 29 and 30, the same or corresponding parts as those in FIGS. 1 to 27 are denoted by the same symbols and descriptions thereof are omitted. The obstacle detection device used for the driving assistance system may be the obstacle detection device of the first embodiment, the obstacle detection device of the second embodiment, or an obstacle detection device of a combination of the first and second embodiments.

As illustrated in FIG. 29, a speaker 201, a display 202, and a brake 203 mounted on a vehicle 100 are connected to an obstacle detection unit 204. The obstacle detection unit 204 includes a processor 204a and a memory 204b.

As illustrated in FIG. 30, the driving assistance system according to the third embodiment includes: the obstacle detection device including a first light projecting unit 1, a second light projecting unit 2, an imaging unit 3, a first reconstruction unit 4, a second reconstruction unit 5, a travel amount calculating unit 6, a moving object detecting unit 7, an integration unit 8, and an obstacle detection unit 9; a collision determination unit 21; an alarm unit 22; and a brake control unit 23.

The collision determination unit 21 performs collision determination between the vehicle 100 and an obstacle by using a detection result of the obstacle detection unit 9, information of a travel amount of the vehicle 100 calculated by the travel amount calculating unit 6, and information of a moving object detected by the moving object detecting unit 7. Note that the collision determination unit 21 may directly receive the information of the travel amount of the vehicle 100 and the information of the moving object from the travel amount calculating unit 6 and the moving object detecting unit 7 or may receive via the integration unit 8 and the obstacle detection unit 9.

For example, as collision determination of the vehicle 100 with respect to a stationary object 133, the collision determination unit 21 predicts future travelling of the vehicle 100 by using a past travel amount of the vehicle 100 and thereby calculates how many seconds later collision with the stationary object 133 occurs. As collision determination of the vehicle 100 with respect to a moving object 134, the collision determination unit 21 predicts future travelling of the vehicle 100 by using a past travel amount of the vehicle 100 and predicts future movement of the moving object 134 by using a past travel amount of the moving object 134, thereby calculating how many seconds later collision with the moving object 134 occurs. Then, the collision determination unit 21 outputs the determination result including the calculated time to the collision to the alarm unit 22 and the brake control unit 23.

The alarm unit 22 issues an alarm to a driver of the vehicle 100 when it detects a situation where the vehicle 100 is highly likely to collide with an obstacle on the basis of the determination result received from the collision determination unit 21. The alarm unit 22 includes the speaker 201 and the display 202 mounted on the vehicle 100 and a controller for controlling the speaker 201 and the display 202. Alternatively, the alarm unit 22 may solely be a controller that controls the speaker 201 and the display 202. That is, it suffices that the alarm unit 22 can issue an alarm as a result of controlling the speaker 201 and the display 202. The alarm unit 22 may output a warning sound from the speaker 201 to notify the driver of the possibility of collision or may display on the display 202 an alarm which notifies of the possibility of collision. Alternatively, the alarm unit 22 may issue an alarm by both the speaker 201 and the display 202, or may issue an alarm from only one of them.

On the basis of the determination result of the collision determination unit 21, the alarm unit 22 issues an alarm in a case where time to collision of the vehicle 100 with an obstacle is shorter than a predetermined length of time (for example, two seconds). It is possible to set different lengths of time for the stationary object 133 and the moving object 134 as time to issuance of an alarm. For example in a situation where the vehicle 100 is parked, the stationary object 133 may be a wall, a pole, or other objects surrounding a parking lot, and the moving object 134 may be a person, especially a child, walking in the parking lot or other objects. Since the significance of collision of the vehicle 100 varies depending on the type of the obstacle, it is desirable to issue an alarm earlier in the case where the obstacle is the moving object 134 as compared with the case where the obstacle is the stationary object 133.

The brake control unit 23 controls the brake 203 to stop the vehicle 100 and thereby avoids collision when detecting a situation where the possibility of collision between the vehicle 100 and the obstacle is extremely high on the basis of the determination result received from the collision determination unit 21. On the basis of the determination result of the collision determination unit 21, the brake control unit 23 activates the brake 203 to stop the vehicle 100 in a case where time to collision of the vehicle 100 with the obstacle is shorter than a predetermined length of time. For example, by setting time to activation of the brake 203 to be shorter than time to issuance of an alarm, the brake 203 may be activated after issuance of the alarm. Furthermore, like in the alarm unit 22 it is also possible in the brake control unit 23 to set different lengths of time for the stationary object 133 and the moving object 134 as time to activation of the brake 203.

The functions of the first reconstruction unit 4, the second reconstruction unit 5, the travel amount calculating unit 6, the moving object detecting unit 7, the integration unit 8, the obstacle detection unit 9, the collision determination unit 21, the alarm unit 22, and the brake control unit 23 in the obstacle detection unit 204 are implemented by software, firmware, or a combination of software and firmware. Software and firmware are described as a program and stored in the memory 204b illustrated in FIG. 29. The processor 204a reads and executes the program stored in the memory 204b and thereby implements the functions of the respective units. That is, the driving assistance system includes the memory 204b for storing a program that, when executed by the processor 104a, results in execution of: a step of reconstructing a shape of a part hit by the first slit light 111 using the image captured by the imaging unit 3; a step of reconstructing a shape of a part hit by the second slit light 112 using the image captured by the imaging unit 3; a step of calculating a travel amount of the vehicle 100; a step of detecting a moving object in the area surrounding the vehicle using the shape reconstructed by the second reconstruction unit 5 and the travel amount of the vehicle 100 calculated by the travel amount calculating unit 6; a step of reconstructing a three-dimensional shape of the area surrounding the vehicle by integrating the shapes reconstructed by the first reconstruction unit 4 using the travel amount of the vehicle 100 calculated by the travel amount calculating unit 6 and information of the moving object detected by the moving object detecting unit 7; a step of detecting an obstacle using the three-dimensional shape reconstructed by the integration unit 8; a step of performing collision determination between the vehicle 100X) and an obstacle using the detection result of the obstacle detection unit 9, the travel amount of the vehicle 100 calculated by the travel amount calculating unit 6, and the information of the moving object detected by the moving object detecting unit 7; a step of issuing an alarm on the basis of the determination result of the collision determination unit 21; and a step of controlling the brake 203 of the vehicle 100 on the basis of the determination result of the collision determination unit 21. In other words, the program causes a computer to execute a procedure or a method of the first reconstruction unit 4, the second reconstruction unit 5, the travel amount calculating unit 6, the moving object detecting unit 7, the integration unit 8, the obstacle detection unit 9, the collision determination unit 21, the alarm unit 22, and the brake control unit 23.

Note that like in the first and second embodiments, the functions of the first light projecting unit 1, the second light projecting unit 2, and the imaging unit 3 as controllers may be implemented by using a dedicated processing circuit or may be implemented by using the processor 204a and the memory 204b of the obstacle detection unit 204.

Furthermore, the functions of the alarm unit 22 and the brake control unit 23 as controllers may be implemented by using a dedicated processing circuit or may be implemented by using the processor 204a and the memory 204b of the obstacle detection unit 204.

As described above, the driving assistance system according to the third embodiment includes: at least one of the obstacle detection device described in the first embodiment and the obstacle detection device described in the second embodiment; the collision determination unit 21 for performing collision determination between the vehicle and an obstacle using a detection result of the obstacle detection unit 9, a travel amount of the vehicle 100 calculated by the travel amount calculating unit 6, and information of an moving object detected by the moving object detecting unit 7 in the obstacle detection device; and the alarm unit 22 for issuing an alarm on the basis of the determination result of the collision determination unit 21. With this configuration, it is possible to detect an obstacle by correctly reconstructing a three-dimensional shape of the area surrounding the vehicle in which a moving object may be present and to issue an alarm to the driver depending on the risk of collision with the obstacle.

Furthermore, the driving assistance system according to the third embodiment may include the brake control unit 23 for controlling the brake of the vehicle on the basis of the determination result of the collision determination unit 21. With this configuration, it is possible to automatically activate the brake to reduce the possibility of collision when the possibility of collision between the vehicle and the obstacle is high.

Note that, within the scope of the present invention, the present invention may include a flexible combination of the individual embodiments, a modification of any component of the individual embodiments, or omission of any component in the individual embodiments.

INDUSTRIAL APPLICABILITY

An obstacle detection device according to the present invention determines a stationary object and a moving object and thereby correctly reconstruct three-dimensional shapes thereof, and thus is suitable for use in a driving assistance system or similar systems.

REFERENCE SIGNS LIST 100, 301, 310: Vehicle, 101, 302: First light projector, 102, 303: Second light projector, 103, 304: Camera, 104, 204: Obstacle detection unit, 104a, 204a: Processor, 104b, 204b: Memory, 105: Yaw rate sensor, 106: Vehicle speed sensor, 110: contact ground surface, 111, 305: First slit light, 112, 306: Second slit light, 113, 307: Imaging area, 121, 315: First cutting shape, 122: Base line, 123: Distance, 131: Roof, 132: Ground, 133, 311: Stationary object, 134, 312: Moving object, 135, 313: Part hit by the first slit light, 136, 314: Part hit by the second slit light, 137, 316: Second cutting shape, 138, 317: Part representing a stationary object out of the second cutting shape, 139, 31: Part representing a moving object out of the second cutting shape, 201: Speaker, 202: Display, 203: Brake, 1: First light projecting unit, 2: Second light projecting unit, 3: Imaging unit, 4: First reconstruction unit, 5: Second reconstruction unit, 6: Travel amount calculating unit, 7: Moving object detecting unit, 8: Integration unit, 9: Obstacle detection unit, 21: Collision determination unit, 22: Alarm unit, 23: Brake control unit.

The invention claimed is:

1. An obstacle detection device comprising:
 a first light projecting unit for projecting first slit light toward an area surrounding a vehicle;
 a second light projecting unit for projecting second slit light that spreads in a width direction or a front-rear direction of the vehicle toward the area surrounding the vehicle in a direction parallel to a contact ground surface on the vehicle;
 an imaging unit for capturing an image of the area surrounding the vehicle from a position not included on either a plane including a direction in which the first slit light spreads and a direction in which the first slit light is projected or a plane including the direction in which the second slit light spreads and the direction in which the second slit light is projected;
 a first reconstruction unit for reconstructing a shape of a part hit by the first slit light using the image captured by the imaging unit;
 a second reconstruction unit for reconstructing a shape of a part hit by the second slit light using the image captured by the imaging unit;
 a travel amount calculating unit for calculating a travel amount of the vehicle; and
 a moving object detecting unit for detecting a moving object in the area surrounding the vehicle using the shape reconstructed by the second reconstruction unit and the travel amount of the vehicle calculated by the travel amount calculating unit,
 wherein an obstacle is detected using the shape reconstructed by the first reconstruction unit, the shape reconstructed by the second reconstruction unit, and the travel amount of the vehicle calculated by the travel amount calculating unit.

2. The obstacle detection device according to claim 1, further comprising:
 an integration unit for reconstructing a three-dimensional shape of the area surrounding the vehicle by integrating shapes reconstructed by the first reconstruction unit using the travel amount of the vehicle calculated by the travel amount calculating unit and information of the moving object detected by the moving object detecting unit; and
 an obstacle detection unit for detecting an obstacle using the three-dimensional shape reconstructed by the integration unit.

3. The obstacle detection device according to claim 1, wherein the second light projecting unit for projecting the second slit light is installed at a position different from that of the first light projecting unit for projecting the first slit light.

4. The obstacle detection device according to claim 1, wherein when the second light projecting unit projects the second slit light that spreads in the width direction of the vehicle, the first slit light spreads in the width direction of the vehicle and is projected in a direction other than the direction parallel to the contact ground surface on the vehicle.

5. The obstacle detection device according to claim 4, wherein the first light projecting unit for projecting the first slit light is installed on at least one of a rear surface and a front surface of the vehicle.

6. The obstacle detection device according to claim 4, wherein the second slit light spreads in the width direction of the vehicle and is projected in at least one of a backward direction and a forward direction of the vehicle.

7. The obstacle detection device according to claim 6, wherein the second light projecting unit for projecting the second slit light is installed on at least one of a rear surface and a front surface of the vehicle.

8. The obstacle detection device according to claim 1, wherein when the second light projecting unit projects the second slit light that spreads in the front-rear direction of the vehicle, the first slit light spreads in a vertical direction and is projected from a side surface of the vehicle in at least one of a right direction, a diagonally forward right direction, a diagonally backward right direction, a left direction, a diagonally forward left direction, and a diagonally backward left direction.

9. The obstacle detection device according to claim 8, wherein the first light projecting unit for projecting the first slit light is installed on at least one of a left side surface and a right side surface of the vehicle.

10. The obstacle detection device according to claim 8, wherein the second slit light spreads in the front-rear direction of the vehicle and is projected in at least one of a left direction and a right direction of the vehicle.

11. The obstacle detection device according to claim 10, wherein the second light projecting unit for projecting the second slit light is installed on at least one of a left side surface and a right side surface of the vehicle.

12. The obstacle detection device according to claim 2,
 wherein the first reconstruction unit and the second reconstruction unit, by using a plurality of images captured in time series by the imaging unit, reconstruct, for each of the plurality of images, a shape of a part hit by the first slit light and a shape of a part hit by the second slit light, respectively,
 the moving object detecting unit detects the moving object in the area surrounding the vehicle using the shapes reconstructed by the second reconstruction unit using the respective plurality of images and the travel amount of the vehicle calculated by the travel amount calculating unit, and
 the integration unit integrates the shapes reconstructed by the first reconstruction unit using the respective plurality of images by using the travel amount of the vehicle calculated by the travel amount calculating unit and information of the moving object detected by the moving object detecting unit.

13. The obstacle detection device according to claim 1, wherein at least one of the first reconstruction unit and the second reconstruction unit calculates a three-dimensional position from coordinate values of a position of the corresponding slit light captured in the image on a basis of a principle of triangulation, by using a position of at least corresponding one of the first light projecting unit and the second light projecting unit, a projection direction of the corresponding slit light, and a position, an imaging direction, and an angle of view of the imaging unit, and thereby reconstructs the corresponding shape.

14. The obstacle detection device according to claim 1, wherein the moving object detecting unit translates a position of a shape before travel of the vehicle reconstructed by the second reconstruction unit by the travel amount of the vehicle on a basis of the shape reconstructed by the second reconstruction unit and the travel amount of the vehicle calculated by the travel amount calculating unit, determines whether the translated shape before the travel and a shape after the travel reconstructed by the second reconstruction unit coincide with each other, and determines that the shapes are those of the moving object in a case where the shapes do not coincide.

15. The obstacle detection device according to claim 2, wherein the moving object detecting unit translates a position of a shape before travel of the vehicle reconstructed by the second reconstruction unit by the travel amount of the vehicle on a basis of the shape reconstructed by the second reconstruction unit and the travel amount of the vehicle calculated by the travel amount calculating unit, detects an amount of shift between the translated shape before the travel and a shape after the travel reconstructed by the second reconstruction unit, and detects the amount of shift as a travel amount of the moving object.

16. The obstacle detection device according to claim 15, wherein the integration unit translates a shape before the travel reconstructed by the first reconstruction unit by the travel amount of the vehicle and the travel amount of the moving object on a basis of the shape reconstructed by the first reconstruction unit, the travel amount of the vehicle calculated by the travel amount calculating unit, and the travel amount of the moving object detected by the moving object detecting unit, integrates the translated shape before the travel and a shape after the travel reconstructed by the first reconstruction unit, and thereby reconstructs the three-dimensional shape of the area surrounding the vehicle.

17. A driving assistance system, comprising:
an obstacle detection device according to claim 1;
a collision determination unit for performing collision determination between the vehicle and an obstacle using an obstacle detection result of the obstacle detection device; and
an alarm unit for issuing an alarm on a basis of the determination result of the collision determination unit.

18. The driving assistance system according to claim 17, further comprising a brake control unit for controlling a brake of the vehicle on a basis of the determination result of the collision determination unit.

19. An obstacle detection method, comprising:
a step of projecting first slit light toward an area surrounding a vehicle;
a step of projecting second slit light that spreads in a width direction or a front-rear direction of the vehicle toward the area surrounding the vehicle in a direction parallel to a contact ground surface on the vehicle;
a step of capturing an image of the area surrounding the vehicle from a position not included on either a plane including a direction in which the first slit light spreads and a direction in which the first slit light is projected or a plane including the direction in which the second slit light spreads and the direction in which the second slit light is projected;
a step of reconstructing a shape of a part hit by the first slit light using the captured image of the area surrounding the vehicle;
a step of reconstructing a shape of a part hit by the second slit light using the captured image of the area surrounding the vehicle;
a step of calculating a travel amount of the vehicle; and
a step of detecting a moving object in the area surrounding the vehicle using the shape of the part hit by the second slit light and the travel amount of the vehicle; and
a step of detecting an obstacle using the shape of the part hit by the first slit light, the shape of the part hit by the second slit light, and the travel amount of the vehicle.

* * * * *